United States Patent
Shahana et al.

(10) Patent No.: US 11,046,392 B2
(45) Date of Patent: Jun. 29, 2021

(54) HUMAN-POWERED VEHICLE CONTROL DEVICE

(71) Applicant: Shimano Inc., Osaka (JP)

(72) Inventors: Satoshi Shahana, Osaka (JP); Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 125 days.

(21) Appl. No.: 16/289,976

(22) Filed: Mar. 1, 2019

(65) Prior Publication Data

US 2019/0300119 A1   Oct. 3, 2019

(30) Foreign Application Priority Data

Mar. 29, 2018  (JP) .............................. JP2018-065724
May 29, 2018  (JP) .............................. JP2018-102324

(51) Int. Cl.
*B62M 25/08*   (2006.01)
*B62J 99/00*   (2020.01)
*B62M 9/122*   (2010.01)
*B62M 25/00*   (2006.01)
*B62J 45/20*   (2020.01)

(52) U.S. Cl.
CPC .............. *B62M 25/08* (2013.01); *B62J 99/00* (2013.01); *B62J 45/20* (2020.02); *B62M 9/122* (2013.01); *B62M 2025/003* (2013.01)

(58) Field of Classification Search
CPC ...... B62M 25/08; B62M 9/122; B62M 9/123; B62M 2025/003; F16H 59/0204
See application file for complete search history.

(56) References Cited

U.S. PATENT DOCUMENTS 5,356,348 A * 10/1994 Bellio ..................... B62M 9/12
                                                    280/238
6,047,230 A *  4/2000 Spencer ................. B62M 25/08
                                                    701/57

(Continued)

FOREIGN PATENT DOCUMENTS

JP       6-127458 A    5/1994
JP      10-203467 A    8/1998

(Continued)

*Primary Examiner* — Edwin A Young
(74) *Attorney, Agent, or Firm* — Global IP Counselors, LLP

(57) ABSTRACT

A human-powered vehicle control device includes an electronic controller for controlling a transmission that changes a ratio of a rotational speed of a drive wheel to a rotational speed of a crank of the human-powered vehicle. The electronic controller switches the transmission from a first control state to a second control state in accordance with at least one of a human drive force, a rider's posture, a vehicle body attitude, a handle force, and a human-powered vehicle travel state, In the first control state, the electronic controller controls the transmission to change the ratio in accordance with an operation of a shift operating unit. In the second control state, irrespective of the operation of the shift operating unit, the electronic controller controls the transmission such that the ratio increases in accordance with the travel state of the human-powered vehicle and/or a travel environment of the human-powered vehicle.

25 Claims, 6 Drawing Sheets

(56) References Cited

U.S. PATENT DOCUMENTS

| | | | | |
|---|---|---|---|---|
| 2013/0054143 | A1* | 2/2013 | DeGolier | G01M 9/06 |
| | | | | 702/3 |
| 2016/0031527 | A1* | 2/2016 | Bortolozzo | B62M 9/123 |
| | | | | 701/58 |
| 2016/0297496 | A1* | 10/2016 | Chen | B62K 25/04 |
| 2016/0368559 | A1* | 12/2016 | Voss | B62K 19/32 |
| 2017/0021897 | A1* | 1/2017 | Bortolozzo | B62M 25/08 |
| 2017/0225743 | A1* | 8/2017 | Hara | B62M 9/132 |
| 2018/0029666 | A1 | 2/2018 | Shahana et al. | |
| 2018/0029668 | A1* | 2/2018 | Miglioranza | B62M 9/1244 |

FOREIGN PATENT DOCUMENTS

| | | |
|---|---|---|
| JP | 10-511621 A | 11/1998 |
| JP | 2016-147669 A | 8/2016 |
| JP | 2017-30701 A | 2/2017 |
| JP | 2018-24416 A | 2/2018 |
| WO | 2016/039197 A1 | 3/2016 |

\* cited by examiner

HUMAN-POWERED VEHICLE CONTROL DEVICE

CROSS-REFERENCE TO RELATED APPLICATIONS

This application claims priority to Japanese Patent Application Nos. 2018-065724, filed on Mar. 29, 2018, and 2018-102324, filed on May 29, 2018. The entire disclosure of Japanese Patent Application Nos. 2018-065724 and 2018-102324 are hereby incorporated herein by reference.

BACKGROUND

Technical Field

The present invention generally relates to a human-powered vehicle control device.

Background Information

In the human-powered vehicle control device according to Japanese Laid-Open Patent Publication No. 10-511621 (Patent Document 1), a transmission is controlled according to prescribed conditions in order to change the transmission ratio.

SUMMARY

Although the control device for the above-described human-powered vehicle controls a transmission in order to reduce the travel load, etc., no other conditions are considered. One object of the present invention is to provide a human-powered vehicle control device that is capable of suitably controlling the transmission.

A human-powered vehicle control device according to a first aspect of the present invention comprises an electronic controller that is configured to control a transmission that changes a ratio of a rotational speed of a drive wheel to a rotational speed of a crank of a human-powered vehicle. The electronic controller is configured to switch a control state of the transmission from a first control state to a second control state in accordance with at least one of a human drive force that is input to the human-powered vehicle, a rider's posture, an attitude of a vehicle body of the human-powered vehicle, a force applied to a handle of the human-powered vehicle, and a travel state of the human-powered vehicle. The electronic controller is configured to control the transmission to change the ratio in accordance with operation of a shift operating unit that can be operated by a rider to change the ratio. The electronic controller is configured to control the transmission such that the ratio increases in accordance with at least one of the travel state of the human-powered vehicle and a travel environment of the human-powered vehicle and irrespective of an operation of the shift operating unit while in the second control state.

With the first aspect of the human-powered vehicle control device, if the electronic controller is in the second control state, the transmission is controlled in accordance with the travel state of the human-powered vehicle and/or the travel environment of the human-powered vehicle such that the ratio increases; therefore, when it is desired to increase the vehicle speed of the human-powered vehicle, the vehicle speed can be suitably increased. As a result, the transmission can be suitably controlled.

In a second aspect of the human-powered vehicle control device according to the first aspect, the electronic controller is configured to switch from the first control state to the second control state upon determining the human drive force becomes greater than or equal to a first prescribed value and a value related to an amount of change in the human drive force becomes greater than or equal to a second prescribed value. The human drive force includes at least one of the rotational speed of the crank, a torque of the human drive force, and a work rate of the human drive force.

With the second aspect of the control device for the human-powered vehicle described above, the electronic controller can be switched from the first control state to the second control state in accordance with at least one of the rotational speed of the crank, the torque of the human drive force, and the work rate of the human drive force.

In a third aspect of the human-powered vehicle control device according to the first or second aspect, the electronic controller is configured to switch from the first control state to the second control state upon determining the rider's posture switches from an in-saddle posture to an out-of-saddle posture.

With the third aspect of the human-powered vehicle control device described above, if the rider changes from the in-saddle posture to the out-of-saddle posture, the electronic controller can be switched from the first control state to the second control state.

In a fourth aspect of the human-powered vehicle control device according to any one of the first to the third aspects, the attitude of the vehicle body of the human-powered vehicle includes a roll angle of the vehicle body, and the electronic controller is configured to switch from the first control state to the second control state upon determining an amount of change in the roll angle of the vehicle body becomes greater than or equal to a first amount of change.

With the fourth aspect of the human-powered vehicle control device described above, if the amount of change in the roll angle of the vehicle body becomes the first amount of change, the electronic controller can be switched from the first control state to the second control state.

In a fifth aspect of the human-powered vehicle control device according to any one of the first to the fourth aspects, the electronic controller is configured to switch from the first control state to the second control state upon determining the force, which is applied to the handle of the human-powered vehicle, is oriented rearward of the human-powered vehicle and becomes greater than or equal to a third prescribed value.

With the fifth aspect of the human-powered vehicle control device described above, if the force that is applied to the handle of the human-powered vehicle and that is oriented rearward of the human-powered vehicle becomes greater than or equal to the third prescribed value, the electronic controller can be switched from the first control state to the second control state.

In a sixth aspect of the human-powered vehicle control device according to any one of the first to the fifth aspects, the travel state of the human-powered vehicle includes an acceleration of the human-powered vehicle, and the electronic controller is configured to switch from the first control state to the second control state upon determining the acceleration becomes greater than or equal to a fourth prescribed value and upon determining a value related to the acceleration becomes greater than or equal to a fifth prescribed value.

With the sixth aspect of the human-powered vehicle control device described above, if the acceleration becomes greater than or equal to the fourth prescribed value and upon determining the value related to the acceleration becomes greater than or equal to the fifth prescribed value, the electronic controller can be switched from the first control state to the second control state.

In a seventh aspect of the human-powered vehicle control device according to the first to the sixth aspects, the electronic controller is configured to switch from the second control state to the first control state if the shift operating unit is operated while in the second control state.

With the seventh aspect of the human-powered vehicle control device described above, if the shift operating unit is operated, the electronic controller can be switched from the second control state to the first control state.

In an eighth aspect of the human-powered vehicle control device according to any one of the first to the seventh aspects, the electronic controller is configured to switch from the second control state to the first control state in accordance with a parameter related to at least one of time, distance, position, speed, and the rotational speed of the crank while in the second control state.

With the eighth aspect of the human-powered vehicle control device described above, the electronic controller can be switched from the second control state to the first control state in accordance with a parameter related to at least one of time, distance, position, speed, and the rotational speed of the crank.

In a ninth aspect of the human-powered vehicle control device according to any one of the first to the eighth aspects, the electronic controller is configured to control a notification unit to notify the rider that the switch has been made in the control state of the transmission.

With ninth aspect of the human-powered vehicle control device described above, switching between the first control state and the second control state can be recognized by the rider by means of the notification unit.

A human-powered vehicle control device according to a tenth aspect of the present invention comprises an electronic controller for controlling a transmission that changes a ratio of a rotational speed of a drive wheel to a rotational speed of a crank of a human-powered vehicle. The electronic controller is configured to switch a control state of the transmission from a third control state to a fourth control state in accordance with an output of a detection unit for detecting at least one of a human drive force that is input to the human-powered vehicle, a rider's posture, an attitude of a vehicle body of the human-powered vehicle, a force applied to a handle of the human-powered vehicle, and a travel state of the human-powered vehicle. The electronic controller is configured to control the transmission to change the ratio in accordance with at least one of a travel state of the human-powered vehicle and a travel environment of the human-powered vehicle while in the third control state. The electronic controller is configured to control the transmission such that the ratio tends to become larger than in the third control state in accordance with at least one of the travel state of the human-powered vehicle and the travel environment of the human-powered vehicle while in the fourth control state.

With the tenth aspect of the human-powered vehicle control device described above, if the electronic controller is in the fourth control state, when it is desired to increase the vehicle speed of the human-powered vehicle, the transmission is controlled such that the ratio becomes greater than when the electronic controller is in the third control state; therefore, when it is desired to increase the vehicle speed of the human-powered vehicle, the vehicle speed can be suitably increased. As a result, the transmission can be suitably controlled.

In an eleventh aspect of the human-powered vehicle control device according to the tenth aspect, the electronic controller is configured to switch from the third control state to the fourth control state upon determining the human drive force becomes greater than or equal to a first prescribed value and a value related to an amount of change in the human drive force becomes greater than or equal to a second prescribed value, and the human drive force includes at least one of the rotational speed of the crank, a torque of the human drive force, and a work rate of the human drive force.

With the eleventh aspect of the human-powered vehicle control device described above, the electronic controller can be switched from the third control state to the fourth control state in accordance with at least one of the rotational speed of the crank, the torque of the human drive force, and the work rate of the human drive force.

In a twelfth aspect of the human-powered vehicle control device according to the tenth or eleventh aspect, the electronic controller is configured to switch from the third control state to the fourth control state upon determining the rider's posture switches from an in-saddle posture to an out-of-saddle posture.

With the twelfth aspect of the human-powered vehicle control device described above, if the rider changes from the in-saddle posture to the out-of-saddle posture, the electronic controller can be switched from the third control state to the fourth control state.

In a thirteenth aspect of the human-powered vehicle control device according to any one of the tenth to the twelfth aspects, the attitude of the vehicle body of the human-powered vehicle includes a roll angle of the vehicle body, and the electronic controller is configured to switch from the third control state to the fourth control state upon determining an amount of change in the roll angle of the vehicle body becomes greater than or equal to a first amount of change.

With the thirteenth aspect of the human-powered vehicle control device described above, if the amount of change in the roll angle of the vehicle body becomes the first amount of change, the electronic controller can be switched from the third control state to the fourth control state.

In a fourteenth aspect of the human-powered vehicle control device according to any one of the tenth to the thirteenth aspects, the electronic controller is configured to switch from the third control state to the fourth control state upon determining a force, which is applied to the handle of the human-powered vehicle, and is oriented rearward of the human-powered vehicle and becomes greater than or equal to a third prescribed value.

With the fourteenth aspect of the human-powered vehicle control device described above, if the force that is applied to the handle of the human-powered vehicle and that is oriented rearward of the human-powered vehicle becomes greater than or equal to the third prescribed value, the electronic controller can be switched from the third control state to the fourth control state.

In a fifteenth aspect of the human-powered vehicle control device according to any one of the tenth to the fourteenth aspects, the travel state of the human-powered vehicle includes an acceleration of the human-powered vehicle, and the electronic controller is configured to switch from the third control state to the fourth control state upon determining the acceleration of the human-powered vehicle becomes greater than or equal to a fourth prescribed value and upon determining a value related to the acceleration becomes greater than or equal to a fifth prescribed value.

With the fifteenth aspect of the human-powered vehicle control device described above, if the acceleration becomes greater than or equal to the fourth prescribed value and if a value related to the acceleration becomes greater than or equal to the fifth prescribed value, the electronic controller can be switched from the third control state to the fourth control state.

In a sixteenth aspect of the human-powered vehicle control device according to any one of the tenth to the fifteenth aspects, in the third control state, the electronic controller is configured to change the ratio such that a parameter related to at least one of a travel state of the human-powered vehicle and a travel environment of the human-powered vehicle is within a first range while in the third control state, and the electronic controller is configured to change the ratio such that the parameter is within a second range, which is different from the first range, while in the fourth control state.

With the sixteenth aspect of the human-powered vehicle control device, if the electronic controller is in the third control state, the parameter can be set within the first range, and if in the fourth control state, the parameter can be set within the second range.

In a seventeenth aspect of the human-powered vehicle control device according to any one of the tenth to the sixteenth aspects, the electronic controller is configured to switch from the fourth control state to the third control state upon determining a shift operating unit has been operated to change the ratio while in the fourth control state.

With the seventeenth aspect of the human-powered vehicle control device described above, if the shift operating unit is operated, the electronic controller can be switched from the fourth control state to the third control state.

In an eighteenth aspect of the human-powered vehicle control device according to any one of the tenth to the sixteenth aspects, in the fourth control state, the electronic controller is configured to switch from the fourth control state to the third control state in accordance with a parameter related to at least one of time, distance, position, speed, and the rotational speed of the crank while in the fourth control state.

With the eighteenth aspect of the human-powered vehicle control device described above, the electronic controller can be switched from the fourth control state to the third control state in accordance with a parameter related to at least one of time, distance, position, speed, and the rotational speed of the crank.

In a nineteenth aspect of the human-powered vehicle control device according to any one of the first to the eighteenth aspects, the control device further comprises a storage unit, which changeably stores a transmission control state switching condition that is related to at least one of the human drive force that is input to the human-powered vehicle, the rider's posture, the attitude of the vehicle body of the human-powered vehicle, the force applied to the handle of the human-powered vehicle, and the travel state of the human-powered vehicle.

With the nineteenth aspect of the human-powered vehicle control device, the condition for switching the control state of the transmission can be changed in accordance with user preference, etc.

A human-powered vehicle control device according to a twentieth aspect of the present invention comprises an electronic controller configured to control a transmission that changes a ratio of a rotational speed of a drive wheel to the rotational speed of a crank of a human-powered vehicle. The controller is configured to switch a control state of the transmission from a fifth control state to a sixth control state. The electronic controller is configured to control the transmission to change the ratio in accordance with an operation of a shift operating unit that can be operated by a rider to change the ratio while in the fifth control state. The electronic controller is configured to control the transmission to change the ratio irrespective of the operation of the shift operating unit. The electronic controller is configured to switch from the fifth shifting condition to the sixth control state in accordance with a prescribed set of conditions irrespective of an operation of an operating unit that can be operated by the rider while in the sixth control state.

With the twentieth aspect of the human-powered vehicle control device described above, the electronic controller, in accordance with the prescribed set of conditions and irrespective of the operation of the operating unit that can be operated by the rider, can be switched from the fifth control state to the sixth control state. As a result, the transmission can be suitably controlled.

In a twenty-first aspect of the human-powered vehicle control device according to the twentieth aspect, the electronic controller is configured to switch from the sixth control state to the fifth control state in accordance with a parameter related to at least one of time, distance, position, speed, and the rotational speed of the crank while in the sixth control state.

With the twenty-first aspect of the human-powered vehicle control device described above, in accordance with a parameter related to at least one of time, distance, position, speed, and the rotational speed of the crank, the electronic controller can be switched from the sixth control state to the fifth control state.

A human-powered vehicle control device according to a twenty-second aspect of the present invention comprises an electronic controller that is configured to control a transmission that changes a ratio of a rotational speed of a drive wheel to the rotational speed of a crank of a human-powered vehicle. The electronic controller is configured to switch from a seventh control state to an eighth control state upon determining at least one of a shift operating unit that can be operated by a rider is operated to change the ratio and the ratio reaches a prescribed ratio. The electronic controller is configured to control the transmission to change in either a direction in which the ratio increases or a direction in which the ratio decreases in accordance with at least one of a travel state of the human-powered vehicle and a travel environment of the human-powered vehicle, and irrespective of an operation of the shift operating unit while in the seventh control state.

With the twenty-second aspect of the human-powered vehicle control device described above, if the shift operating unit is operated in order to change the ratio and/or if the ratio reaches a prescribed ratio, the electronic controller can be switched from the seventh control state to the eighth control state. As a result, the transmission can be suitably controlled.

In a twenty-third aspect of the human-powered vehicle control device according to the twenty-second aspect, the electronic controller is configured to switch from a ninth control state to the seventh control state in accordance with at least one of a human drive force that is input to the human-powered vehicle, a rider's posture, an attitude of a vehicle body of the human-powered vehicle, a force applied to a handle of the human-powered vehicle, and a travel state of the human-powered vehicle, and the electronic controller is configured to control the transmission to change the ratio in accordance with the operation of the shift operating unit while in the ninth control state.

With the twenty-third aspect of the human-powered vehicle control device described above, the electronic controller can be switched from the ninth control state to the seventh control state in accordance with at least one of the human drive force, the rider's posture, the attitude of the vehicle body of the human-powered vehicle, the force applied to the handle of the human-powered vehicle, and the travel state of the human-powered vehicle.

In a twenty-fourth aspect of the human-powered vehicle control device according to the twenty-third aspect, the ninth control state is the eighth control state.

With the twenty-fourth aspect of the human-powered vehicle control device described above, the control program related to the eighth control state can be identical to the control program related to the ninth control state.

In a twenty-fifth aspect of the human-powered vehicle control device according to any one of the twenty-second to the twenty-fourth aspects, the prescribed ratio is either the largest ratio or the smallest ratio that the human-powered vehicle can assume.

With the twenty-fifth aspect of the human-powered vehicle control device described above, if the prescribed ratio is either a largest ratio or a smallest ratio that the transmission can obtained.

The human-powered vehicle control device according to the present invention is configured to suitably control the transmission.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 50 according to a first embodiment will be described with reference to FIGS. 1 to 4. The human-powered vehicle control device 50 will hereinafter be referred to simply as the control device 50. The control device 50 is provided in a human-powered vehicle 10. The human-powered vehicle 10 is a vehicle that can be powered by at least human drive force. The human-powered vehicle 10 includes, for example, a bicycle. The number of wheels is not limited, and the human-powered vehicle 10 includes a vehicle having one wheel, or three or more wheels. Examples of the human-powered vehicle 10 include various types of bicycles, such as mountain bikes, road bikes, city bikes, cargo bikes, and recumbent bikes, as well as electric-assist bicycles (E-bikes). Hereinbelow, the human-powered vehicle 10 is described as a bicycle in the embodiments.

Figure 1:
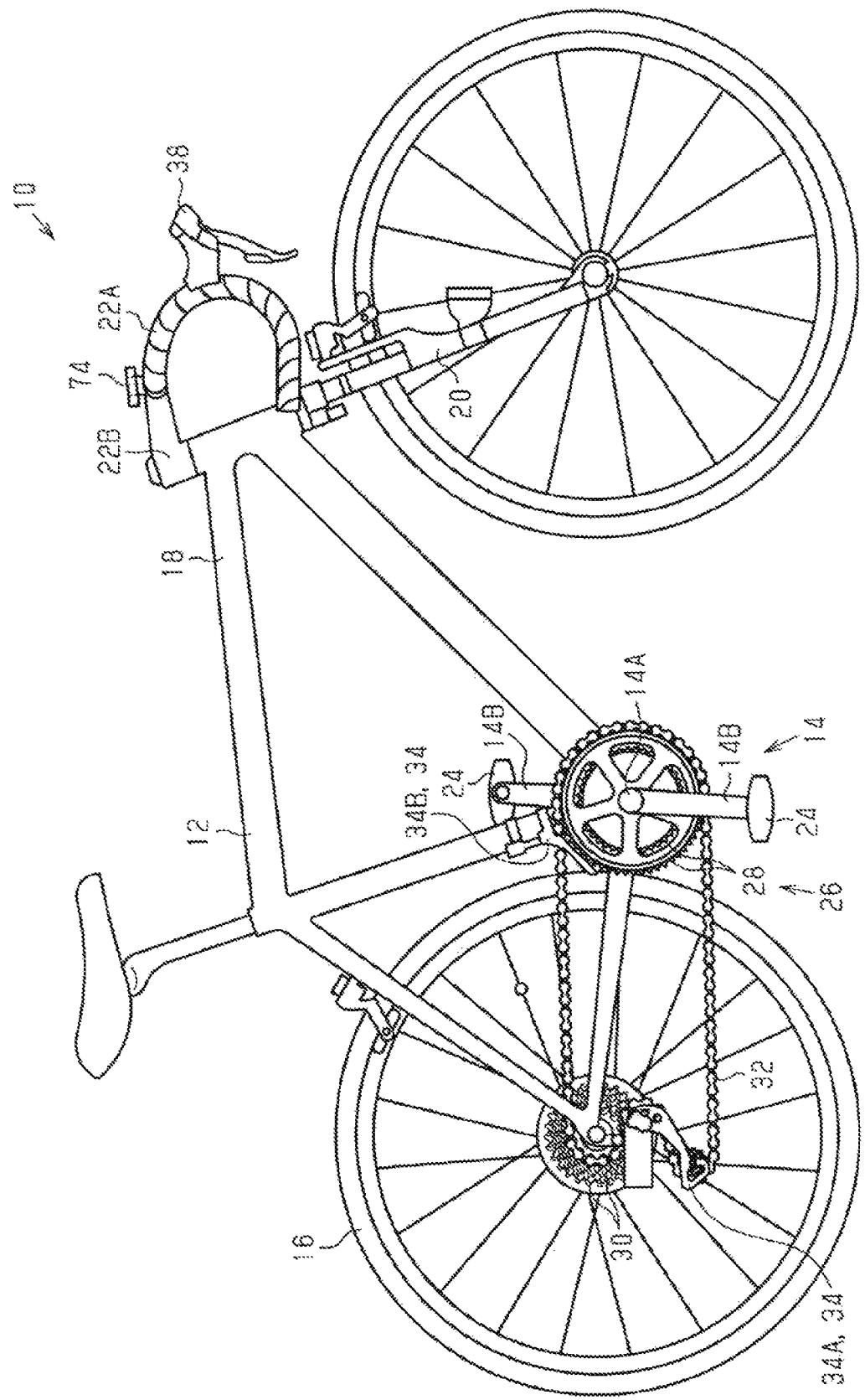
FIG. 1 is a side elevational view of a human-powered vehicle that includes a human-powered vehicle control device according to a first embodiment.

As shown in FIG. 1, the human-powered vehicle 10 comprises a vehicle body 12, a crank 14, and a drive wheel 16. The vehicle body 12 includes a frame 18, a front fork 20, a handle 22A, and a stem 22B. A human drive force H is input to the crank 14. The crank 14 includes a crankshaft 14A that can be rotated relative to the frame 18, and crank arms 14B that are respectively provided at the axial ends of the crankshaft 14A. A pedal 24 is connected to each of the crank arms 14B. The drive wheel 16 is driven by means of rotation of the crank 14. The drive wheel 16 is supported by the frame 18. The crank 14 and the drive wheel 16 are connected by a drive mechanism 26. The drive mechanism 26 includes a first rotating body 28 that is coupled to the crankshaft 14A. The crankshaft 14A and the first rotating body 28 also can be coupled via a first one-way clutch. The first one-way clutch is configured such that the first rotating body 28 is rotated forward upon the crank 14 being rotated forward and such that the first rotating body 28 is prevented from rotating backward upon the crank 14 being rotated backward. The first rotating body 28 includes a sprocket, a pulley, or a bevel gear. The drive mechanism 26 further includes a second rotating body 30 and a connecting member 32. The connecting member 32 transmits the rotational force of the first rotating body 28 to the second rotating body 30. Examples of the connecting member 32 include a chain, a belt, and a shaft.

The second rotating body 30 is connected to the drive wheel 16. The second rotating body 30 includes a sprocket, a pulley, or a bevel gear. A second one-way clutch is preferably provided between the second rotating body 30 and the drive wheel 16. The second one-way clutch is configured such that the drive wheel 16 is rotated forward upon the second rotating body 30 being rotated forward and such that the drive wheel 16 is prevented from rotating backward upon the second rotating body 30 being rotated backward.

The human-powered vehicle 10 comprises a front wheel and a rear wheel. The front wheel is attached to the frame 18 via the front fork 20. The handle 22A is connected to the front fork 20 via the stem 22B. In the following embodiment, the rear wheel is described as the drive wheel 16, but the front wheel can be the drive wheel 16.

The human-powered vehicle 10 includes a transmission 34. The transmission 34 is configured to be driven by an electric actuator 36 (refer to FIG. 2). The transmission 34 constitutes a transmission device together with the electric actuator 36. The electric actuator 36 includes an electric motor. The transmission 34 is used for changing the ratio R of the rotational speed of the drive wheel 16 to the rotational speed N of the crank 14. The transmission 34 is configured to change the ratio R in stepwise fashion. The electric actuator 36 causes the transmission 34 to execute a shifting operation. The transmission 34 is controlled by an electronic controller 52 of the control device 50. The electronic controller 52 will hereinafter be referred to simply as the controller 52. The electric actuator 36 is connected so as to be capable of communicating with the controller 52 by means of wired or wireless communication. The electric actuator 36 is capable of communicating with the controller 52 by means of, for example, power line communication (PLC). The electric actuator 36 causes the transmission 34 to execute the shifting operation in accordance with a control signal from the controller 52. The transmission 34 includes an internal transmission and/or an external transmission (derailleur). The transmission 34 includes a rear transmission 34A and/or a front transmission 34B. The rear transmission 34A changes the ratio of the rotational speed of the drive wheel 16 to the rotational speed N of the crank 14. Specifically, the rear transmission 34A changes the ratio of the turning radius of the second rotating body 30 that is connected to the connecting member 3 to the turning radius of the drive wheel 16. The transmission 34 can include the front transmission 34B. The front transmission 34B changes the ratio of the rotational speed of the drive wheel 16 to the rotational speed N of the crank 14. Specifically, the front transmission 34B changes the ratio of the turning radius of the first rotating body 28 that is connected to the connecting member 32 to the turning radius of the crank 14. The transmission 34 can include both the rear transmission 34A and the front transmission 34B.

The human-powered vehicle 10 includes a shift operating unit 38 for changing the ratio R. The shift operating unit 38 can be provided on a handle 22A, for example. The shift operating unit 38 is preferably a shifter. The shift operating unit 38 is preferably provided for each of the rear transmission 34A and the front transmission 34B. The shift operating unit 38 is connected so as to be capable of communication with the controller 52 by means of wired or wireless communication. The shift operating unit 38 is capable of communication with the controller 52 by means of power line communication (PLC), for example. If the shift operating unit 38 is operated, then the controller 52 causes the transmission 34 to execute a shifting operation.

Figure 2:
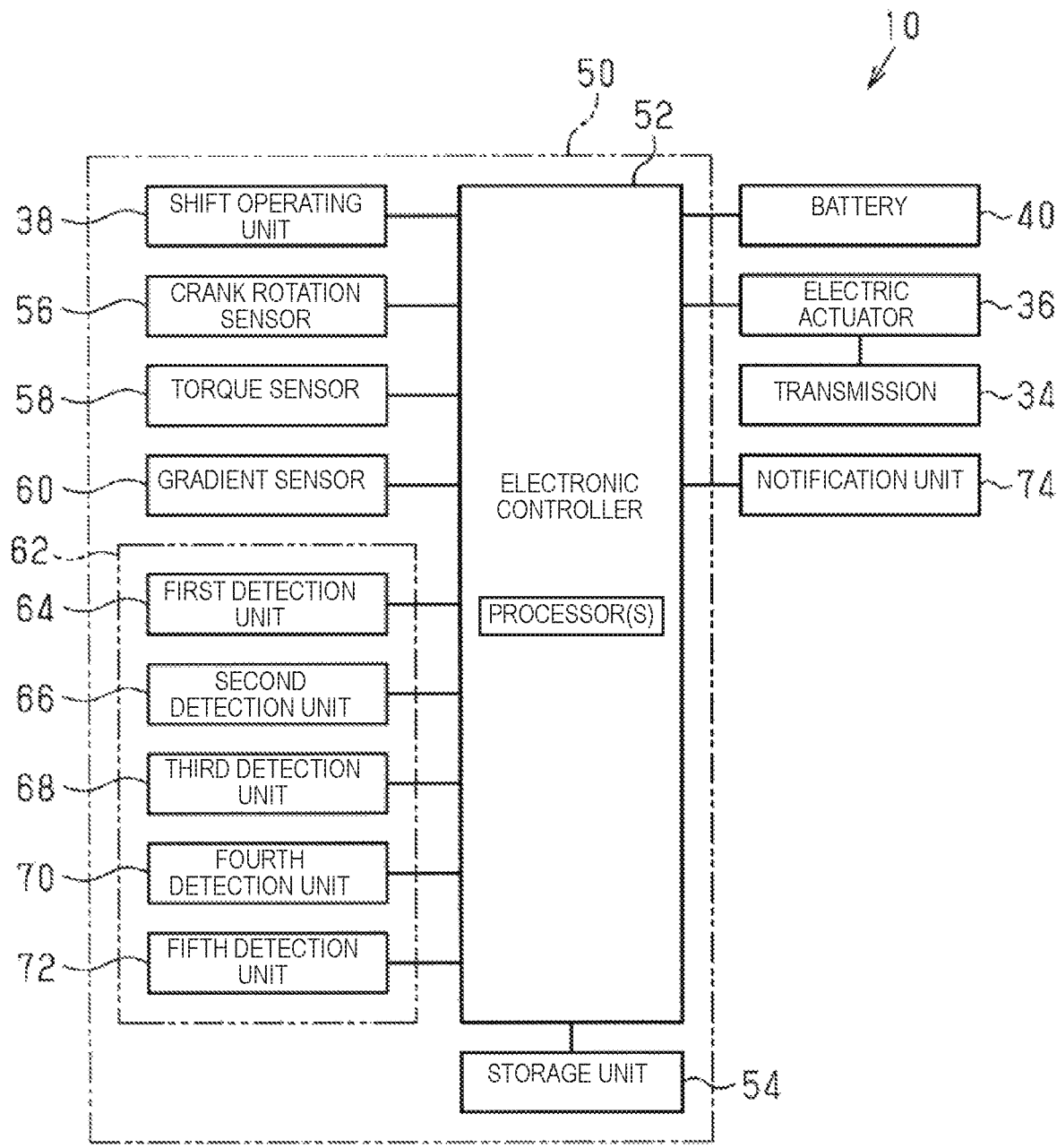
FIG. 2 is a block diagram showing an electrical configuration of the human-powered vehicle control device according to the first embodiment.

As shown in FIG. 2, the human-powered vehicle 10 further comprises a battery 40. The battery 40 includes one or a plurality of battery cells. The battery cell includes a rechargeable battery. The battery 40 is provided on the human-powered vehicle 10 and supplies electric power to other electrical components that are electrically connected to the battery 40 by wire, such as the transmission 34 and the control device 50. The battery 40 is connected so as to be capable of communication with the controller 52 of the control device 50 by means of wired or wireless communication. The battery 40 is capable of communication with the controller 52 by means of power line communication (PLC), for example. The battery 40 can be attached to the outside of the frame 18, or at least a portion thereof can be accommodated inside the frame 18.

As mentioned above, the control device 50 comprises the controller 52. The controller 52 includes a calculation processing device (one or more processors) that executes a preset control program. The calculation processing device comprises, for example, a CPU (Central Processing Unit) or an MPU (Micro Processing Unit). The controller 52 can include one or a plurality of microcomputers. The controller 52 can include a plurality of calculation processing devices that are arranged in a plurality of separate locations. The terms "electronic controller" or "controller" as used herein refers to hardware that executes a software program. The terms "electronic controller" or "controller" as used herein do not include humans. The control apparatus 50 further comprises a storage unit 54. The storage unit 54 stores control programs and information used for various control processes. The storage unit 54 is any computer storage device or any computer readable medium with the sole exception of a transitory, propagating signal. The storage unit 54 includes, for example, nonvolatile memory and volatile memory and can includes a ROM (Read Only Memory) device, a RAM (Random Access Memory) device, a hard disk, a flash drive, etc. The controller 52 and the storage unit 54 are provided in the transmission 34, for example.

The controller 52 controls the transmission 34, which changes the ratio R of the rotational speed of the drive wheel 16 to the rotational speed of the crank 14 of the human-powered vehicle 10. The controller 52 is configured to switch the control state of the transmission 34 from the first control state to the second control state in accordance with at least one of a human drive force H that is input to the human-powered vehicle 10, the rider's posture, the attitude of the vehicle body 12 of the human-powered vehicle 10, the force applied to the handle 22A of the human-powered vehicle 10, and the travel state of the human-powered vehicle 10. In the first control state, the controller 52 controls the transmission 34 to change the ratio R in accordance with an operation of the shift operating unit 38 that can be operated by the rider in order to change the ratio R. In the second control state, the controller 52 controls the transmission 34 such that the ratio R increases in accordance with at least one of the travel state of the human-powered vehicle 10 and the travel environment of the human-powered vehicle 10, irrespective of the operation of the shift operating unit 38.

In the second control state, the controller 52 preferably controls the transmission 34 to change only in a direction in which the ratio R increases, in accordance with at least one of the travel state of the human-powered vehicle 10 and the travel environment of the human-powered vehicle 10. In the second control state, the controller 52 controls the transmission 34 to change only in a direction in which the ratio R increases, in accordance with at least one of the travel state of the human-powered vehicle 10 and the travel environment of the human-powered vehicle 10 and irrespective of the operation of the shift operating unit 38, and does not control the transmission 34 to change in the direction of decreasing ratio R.

In the second control state, if a condition to change the ratio R, which is related to a parameter P, which is related to the travel state of the human-powered vehicle 10 and the travel environment of the human-powered vehicle 10, is satisfied, the controller 52 controls the transmission 34 such that the ratio R increases. In the second control state, if the parameter P, which is related to the travel state and the travel environment of the human-powered vehicle 10 becomes greater than or equal to a first value, the controller 52 controls the transmission 34 such that the ratio R increases.

The parameter P includes at least one of the human drive force H and the gradient of the road surface on which the human-powered vehicle 10 travels. The human drive force H includes at least one of the rotational speed N of the crank 14, the torque HT of the human drive force H, and the work rate HW of the human drive force H. The work rate HW can be obtained, for example, by multiplying the rotational speed N of the crank 14 by the torque HT. The first value is set to an appropriate value for each of the rotational speed N of the crank 14, the torque HT of the human drive force H, and the work rate HW of the human drive force H.

If the controller 52 controls the transmission 34 such that the ratio R increases in accordance with the human drive force H in the second control state, then the control device 50 preferably includes a crank rotation sensor 56 and/or a torque sensor 58.

The crank rotation sensor 56 is used for detecting the rotational speed N of the crank 14 of the human-powered vehicle 10. The crank rotation sensor 56 can be attached, for example, to the frame 18 of the human-powered vehicle 10. The crank rotation sensor 56 is configured to include a magnetic sensor that outputs a signal corresponding to the magnetic field strength. An annular magnet in which the magnetic field strength changes in the circumferential direction is provided on the crankshaft 14A or on the power transmission path extending from the crankshaft 14A to the first rotating body 28. The crank rotation sensor 56 is connected so as to be capable of communication with the controller 52 by means of wired or wireless communication. The crank rotation sensor 56 outputs a signal corresponding to the rotational speed N of the crank 14 to the controller 52. The crank rotation sensor 56 can be provided on a member that rotates integrally with the crankshaft 14A on the power transmission path of the human drive force H extending from the crankshaft 14A to the first rotating body 28. For example, in the case that the first one-way clutch is not provided between the crankshaft 14A and the first rotating body 28, the crank rotation sensor 56 can be provided on the first rotating body 28.

The torque sensor 58 is used for detecting the torque HT of the human drive force H. The torque sensor 58 is provided, for example, on the crankshaft 14A. The torque sensor 58 detects the torque of the human drive force H that is input to the crank 14. For example, in the case that the first one-way clutch is provided in the power transmission path, the torque sensor 58 is provided on the upstream side of first one-way clutch. The torque sensor 58 includes a strain sensor, a magnetostrictive sensor, or the like. The strain sensor includes a strain gauge. If the torque sensor 58 includes the strain sensor, then the strain sensor is preferably provided on an outer peripheral portion of a rotating body placed in the power transmission path. The torque sensor 58 can include a wireless or wired communication unit. The communication unit of the torque sensor 58 is configured to be capable of communicating with the controller 52.

If the controller 52 controls the transmission 34 such that the ratio R increases in accordance with road surface gradient in the second control state, then the control device 50 preferably includes a gradient sensor 60. The gradient sensor 60 is used for detecting the gradient of the road surface on which the human-powered vehicle 10 travels. The gradient sensor 60 includes a tilt sensor for detecting the pitch angle of the human-powered vehicle 10. The tilt sensor can detect the pitch angle of the human-powered vehicle 10 as the gradient of the road surface on which the human-powered vehicle 10 travels. The gradient of the road surface on which the human-powered vehicle 10 travels can be detected by means of the pitch angle of the human-powered vehicle 10 in the direction of travel. The gradient of the road surface on which the human-powered vehicle 10 travels corresponds to the tilt angle of the human-powered vehicle 10. The gradient sensor 60 includes the tilt sensor. One example of the tilt sensor is a gyro sensor or an acceleration sensor. In another example, the gradient sensor 60 includes a GPS (Global Positioning System) receiver. The controller 52 can calculate the gradient of the road surface on which the human-powered vehicle 10 travels in accordance with GPS information acquired by the GPS receiver and the road surface gradient that is included in map information that is prestored in the storage unit 54.

In the first control state, if the switching condition for the second control state is met, the controller 52 is configured to switch from the first control state to the second control state. The switching condition for the second control state, which is a control state for the transmission 34, includes a condition related to at least one of the human drive force H that is input to the human-powered vehicle 10, the rider's posture, the attitude of the vehicle body 12 of the human-powered vehicle 10, the force applied to the handle 22A of the human-powered vehicle 10, and the travel state of the human-powered vehicle 10.

The control device 50 preferably includes a detection unit 62 for detecting at least one of the human drive force H that is input to the human-powered vehicle 10, the rider's posture, the attitude of the vehicle body 12 of the human-powered vehicle 10, the force applied to the handle 22A of the human-powered vehicle 10, and the travel state of the human-powered vehicle 10. The control device 50 is configured to switch from the first control state to the second control state in accordance with the output of the detection unit 62.

In the first example, the condition for switching to the second control state is related to the human drive force H that is input to the human-powered vehicle 10. If the human drive force H becomes greater than or equal to a first prescribed value HX and a value related to the amount of change DH in the human drive force H becomes greater than or equal to a second prescribed value DHX, then the controller 52 switches from the first control state to the second control state. The human drive force H includes at least one of the rotational speed N of the crank 14, the torque HT of the human drive force H, and the work rate HW of the human drive force H. The value related to the amount of change DH in the human drive force H includes the amount of change DH and the values obtained by calculating the first or higher time derivative of the amount of change DH. Here, the detection unit 62 preferably includes the first detection unit 64 that can detect the human drive force H. The first prescribed value HX is set to an appropriate value for each of the rotational speed N of the crank 14, the torque HT of the human drive force H, and the work rate HW of the human drive force H. The second prescribed value DHX is set to an appropriate value for each of the amount of change DH in the rotational speed N of the crank 14, the amount of change DH in the torque HT of the human drive force H, and the amount of change DH in the work rate HW of the human drive force H. Preferably, the first prescribed value HX and the second prescribed value DHX are set to values for determining cases in which the rider intends to ride the human-powered vehicle 10 at high exercise load. An example of a case in which the rider intends to ride at high exercise load is competitive sprinting.

The first detection unit 64 detects the human drive force H. In the case that the human drive force H includes at least one of the rotational speed N of the crank 14 and the value related to the amount of change DH in the rotational speed N of the crank 14, the first detection unit 64 preferably includes the crank rotation sensor. In the case that the human drive force H includes the torque HT and/or the value related to the amount of change DH in the torque HT, the first detection unit 64 preferably includes the torque sensor. In the case that the human drive force H includes the work rate HW of the human drive force H and/or the work rate HW, the first detection unit 64 preferably includes the torque sensor and the crank rotation sensor. In this case, the crank rotation sensor is configured similarly to the crank rotation sensor 56 and can be integrally configured with the crank rotation sensor 56. Moreover, the torque sensor in this case is configured similarly to the torque sensor 58 and can be integrally configured with the torque sensor.

In the second example, the switching condition for the second control state is related to the riding posture. The controller 52 switches from the first control state to the second control state if the rider changes from the in-saddle posture to the out-of-saddle posture. Preferably, in this case, the detection unit 62 includes a second detection unit 66 that can detect a parameter Q that changes according to the riding posture. In the first control state, if the parameter Q changes to a value that corresponds to out-of-saddle riding, the controller 52 determines that the rider's posture has switched from the in-saddle posture to the out-of-saddle posture. More preferably, in the first control state, if the parameter Q becomes a value that corresponds to out-of-saddle riding and a value that corresponds to the rider's intention to ride the human-powered vehicle 10 at high exercise load, the controller 52 switches from the first control state to the second control state.

For example, the parameter Q includes the torque HT of the human drive force H. The magnitude of the torque HT of the human drive force H varies depending on whether the rider is in the in-saddle posture or the out-of-saddle posture. The torque HT of the human drive force H is larger for a rider in the out-of-saddle posture than in the in-saddle posture. The controller 52 can thereby determine the rider's posture according to the torque HT of the human drive force H. In this case, the second detection unit 66 preferably includes the torque sensor. The torque sensor in this case is configured similarly to the torque sensor 58 and can be integrally configured with the torque sensor. The controller 52 can determine that the rider is in the out-of-saddle posture if the magnitude of the torque HT of the human drive force H is greater than a prescribed value if the rotational phase of the crank 14 is in a prescribed range. The prescribed range preferably includes an angle that is 90 degrees away from top dead center and bottom dead center of the crank 14.

For example, the parameter Q includes the relationship between the change in the human drive force H and the change in the phase of the crank 14. The relationship between the change in the human drive force H and the change in the phase of the crank 14 of the drive wheel 10 varies for the in-saddle posture and the out-of-saddle posture. Specifically, the phase of the crank 14 at which the torque HT of the human drive force H reaches a maximum differs for the case in which the rider is in the out-of-saddle posture and that for the rider in the in-saddle posture. For example, if the phase of the crank 14 at which the torque of the human drive force H reaches a maximum is the corresponding phase for the case in which the rider is in the out-of-saddle posture, the controller 52 determines that the rider's posture has switched from the in-saddle posture to the out-of-saddle posture. Here, the second detection unit 66 preferably includes the crank rotation sensor and the torque sensor. In this case, the crank rotation sensor is configured similarly to the crank rotation sensor 56 and can be integrally configured with the crank rotation sensor 56. Moreover, the torque sensor in this case is configured similarly to the torque sensor 58 and can be integrally configured with the torque sensor.

For example, the parameter Q includes the amount of change DD in the roll angle D of the human-powered vehicle 10. When the rider is in the out-of-saddle posture, the amount of change DD in the roll angle D of the human-powered vehicle 10 is larger than when the rider is in the in-saddle posture. In this case, the second detection unit 66 preferably includes the tilt sensor. In this case, the tilt sensor is configured similarly to the tilt sensor of the gradient sensor 60 and can be integrally configured with the tilt sensor of the gradient sensor 60.

In the third example, the condition for switching to the second control state is related to the attitude of the vehicle body 12 of the human-powered vehicle 10. The attitude of the vehicle body 12 of the human-powered vehicle 10 includes the roll angle D of the vehicle body 12, and if the amount of change DD in the roll angle D of the vehicle body 12 becomes greater than or equal to a first amount of change DDX, the controller 52 switches from the first control state to the second control state. In this case, the detection unit 62 preferably includes a third detection unit 68 for detecting the roll angle D of the vehicle body 12. The third detection unit 68 includes the tilt sensor. In this case, the tilt sensor is configured similarly to the tilt sensor of the gradient sensor 60, and can be integrally configured with the tilt sensor of the gradient sensor 60. The tilt sensor of the third detection unit 68 can be a tilt sensor that does not detect the pitch angle. The first amount of change DDX can be different from, or be the same as, the parameter Q related to the amount of change DD in the roll angle D of the second example.

In the fourth example, the condition for switching to the second control state includes the force that is applied to the handle 22A of the human-powered vehicle 10. If the force S that is applied to the handle 22A of the human-powered vehicle 10 and that is oriented rearward of the human-powered vehicle 10 becomes greater than or equal to a third prescribed value SX, then the controller 52 switches from the first control state to the second control state. In this case, the detection unit 62 preferably includes a fourth detection unit 70 for detecting the force S that is applied to the handle 22A and that is oriented rearward of the human-powered vehicle 10. The fourth detection unit 70 includes, for example, a pressure sensor provided on the handle 22A.

In the fifth example, the condition for switching to the second control state includes the travel state of the human-powered vehicle 10. The travel state of the human-powered vehicle 10 includes the acceleration A of the human-powered vehicle 10, and if the acceleration A becomes greater than or equal to a fourth prescribed value AX and if the value DA related to the acceleration A becomes greater than or equal to a fifth prescribed value DAX, the controller 52 switches from the first control state to the second control state. The value DA related to the acceleration A includes, for example, the values obtained by differentiating the acceleration A with respect to time one or more times. In this case, the detection unit 62 preferably includes a fifth detection unit 72 for detecting the acceleration A.

The fifth detection unit 72 preferably includes the vehicle speed sensor. The vehicle speed sensor is used for detecting the rotational speed of the wheel. The vehicle speed sensor outputs a signal corresponding to the rotational speed of the wheel. The controller 52 calculates the vehicle speed V of the human-powered vehicle 10 based on the rotational speed of the wheel. The vehicle speed sensor preferably includes a magnetic reed that constitutes a reed switch or a Hall element. The vehicle speed sensor is attached to a chainstay on the frame 18 and senses a magnet attached to the rear wheel. The controller 52 can calculate the acceleration A by differentiating the speed V, or by calculating the amount of change in the speed V per a prescribed period of time.

If one or more conditions for switching from the first control state to the second control state that are exemplified in the first to the fifth examples are met, then the controller 52 is configured to switch from the first control state to the second control state. Preferably, if two or more conditions for switching from the first control state to the second control state that are exemplified in the first to the fifth examples are met, then the controller 52 switches from the first control state to the second control state. If the two or more conditions for switching from the first control state to the second control state that are exemplified in the first to the fifth examples are met, then the controller 52 can precisely determine those cases in which the rider intends to ride the human-powered vehicle 10 at high exercise load.

In the second control state, if the condition for switching to the first control state is met, the controller 52 is configured to switch from the second control state to the first control state In one example, the condition for switching to the first control state is related to an operation of the shift operating unit 38. In the second control state, if the shift operating unit 38 is operated, the controller 52 switches from the second control state to the first control state.

In another example, the condition for switching to the first control state is related to at least one of time, distance, position, speed V, and the rotational speed N of the crank. In the second control state, the controller 52 switches from the second control state to the first control state in accordance with a parameter related to at least one of time, distance, position, speed V, and the rotational speed N of the crank 14. More specifically, the controller 52 switches from the second control state to the first control state in accordance with at least one of following: the time that has elapsed since the control state was switched from the first control state to the second control state, the distance that the human-powered vehicle 10 has traveled since the control state was switched from the first control state to the second control state, the amount of movement in the position of the human-powered vehicle 10 since the control state was switched from the first control state to the second control state, the position of the human-powered vehicle 10 based on geographical coordinates, the speed V of the human-powered vehicle 10, and the rotational speed N of the crank 14.

The controller 52 can control a notification unit 74 to notify the rider that there has been a switch from the first control state to the second control state or from the second control state to the first control state. For this case, the human-powered vehicle 10 preferably further includes the notification unit 74. The notification unit 74 includes, for example, a cycle computer. The notification unit 74 can be an external device capable of communicating with the controller 52. The external device includes, for example, portable devices such as smartphones. The notification unit 74 includes a display unit and/or a speaker, which notify the rider of a switch between the first control state and the second control state by means of a visual display on the display unit, a sound output from the speaker, or the like.

The storage unit 54 can be configured to changeably store a condition for switching the control state of the transmission 34 related to at least one of the human drive force H that is input to the human-powered vehicle 10, the rider's posture, the attitude of the vehicle body 12 of the human-powered vehicle 10, the force applied to the handle 22A of the human-powered vehicle 10, and the travel state of the human-powered vehicle 10. Specifically, the storage unit 54 changeably stores a determination value that is included in the condition for switching to the second control state. In addition, the storage unit 54 changeably stores a determination value that is included in the condition for switching to the first control state. The user can change each determination value via an operating unit, or the like. The operating unit is provided in a cycle computer, an external device, or the like.

Figure 3:
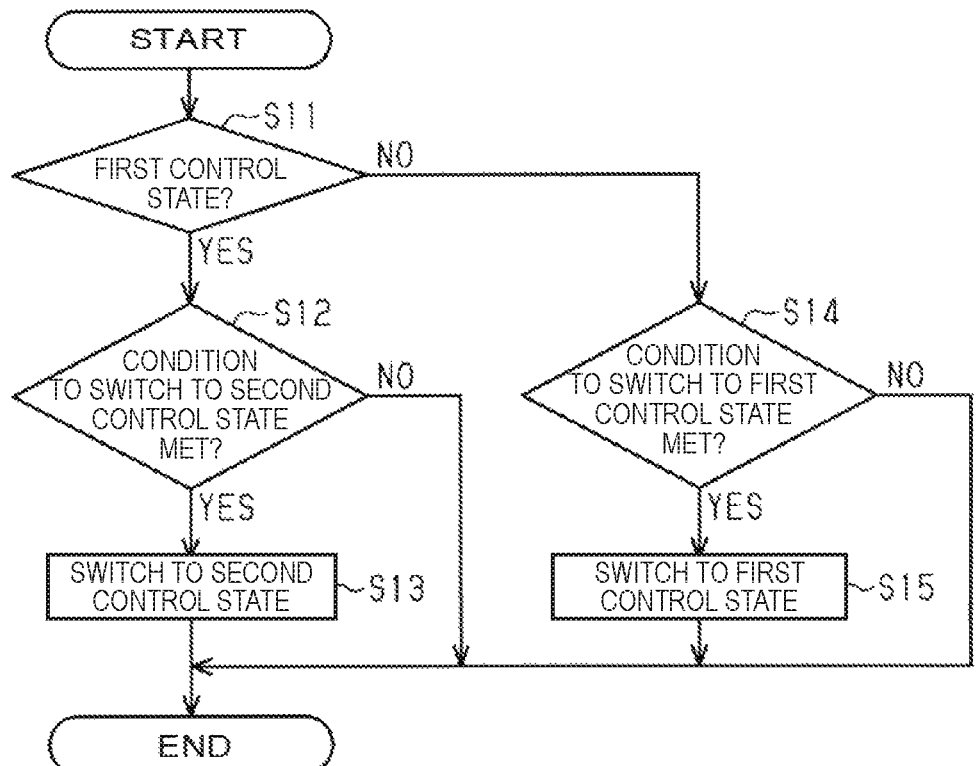
FIG. 3 is a flow chart of the control process for switching between a first control state and a second control state executed by the controller of FIG. 2.

The process for switching between the first control state and the second control state will be described with reference to FIG. 3. If electric power is supplied to the controller 52 from the battery 40, then the controller 52 initiates the process and proceeds to Step S11 of the flow chart shown in FIG. 3. The controller 52 executes the process from Step S11 each prescribed cycle as long as the electric power is being supplied.

In Step S11, it is determined whether the controller 52 is in the first control state. If it is determined that the controller 52 is in the first control state, then the process proceeds to Step S12. In Step S12, the controller 52 determines whether the condition for switching to the second control state is met. If the condition for switching to the second control state is not met, then the controller 52 ends the process. If the condition for switching to the second control state is met, then the controller 52 proceeds to Step S13. In Step S13, the controller 52 switches to the second control state and ends the process.

If it is determined that it is not the first control state in Step S11, then the controller 52 proceeds to Step S14. In Step S14, the controller 52 determines whether the condition for switching to the first control state is met. If the condition for switching to the first control state is not met, then the controller 52 ends the process. If the condition for switching to the first control state is met, then the controller 52 proceeds to Step S15. In Step S15, the controller 52 switches to the first control state and ends the process.

Figure 4:
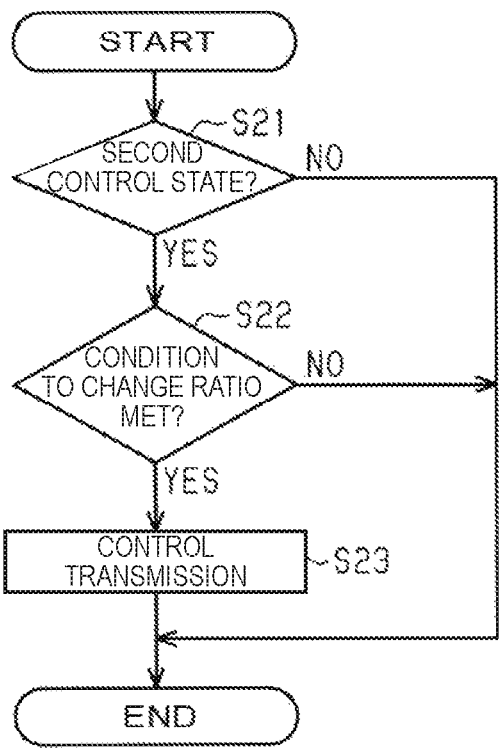
FIG. 4 is a flow chart of the control process for controlling the transmission in the second control state that is executed by the controller of FIG. 2.

The process for changing the ratio R in the second control state will be described with reference to FIG. 4. If the electric power is supplied to the controller 52 from the battery 40, then the controller 52 starts the process and proceeds to Step S21 of the flow chart shown in FIG. 4. The controller 52 executes the process from Step S21 every prescribed cycle as long as the electric power is being supplied.

In Step S21, it is determined whether the controller 52 is in the second control state. If the controller 52 is not in the second control state, then the process is ended. If the controller 52 is in the second control state, then the process proceeds to Step S22.

In Step S22, the controller 52 determines whether a condition to change the ratio R has been met. If the condition to change the ratio R is not met, then the controller 52 ends the process. If the condition to change the ratio R is met, then the controller 52 proceeds to Step S23. In Step S23, the controller 52 controls the transmission 34 and ends the process.

By switching from the first control state to the second control state if the rider intends to ride the human-powered vehicle 10 at high exercise load, it becomes easier for the controller 52 to increase the ratio R and it becomes possible to increase the speed V of the human-powered vehicle 10. In this case, because it is possible for the rider to increase the ratio R without using the shift operating unit 38, the rider is less likely to be bothered. Accordingly, it is possible to contribute to usability.

Second Embodiment

Figure 5:
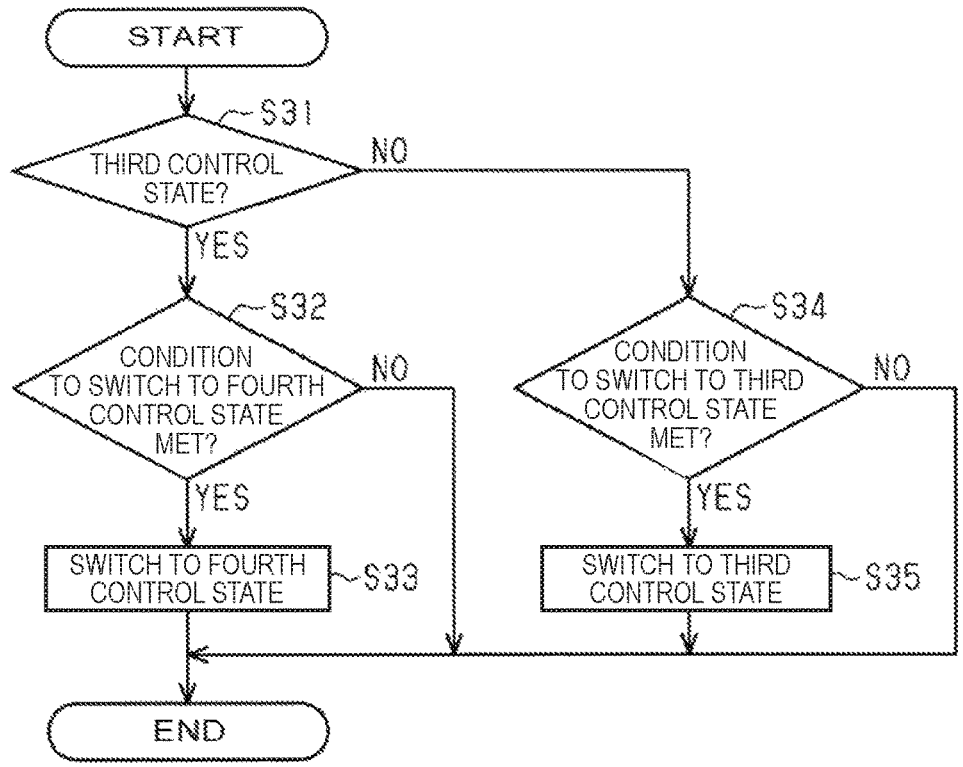
FIG. 5 is a flow chart of the control process for switching between the first control state and the second control state executed by the controller of a second embodiment.
Figure 6:
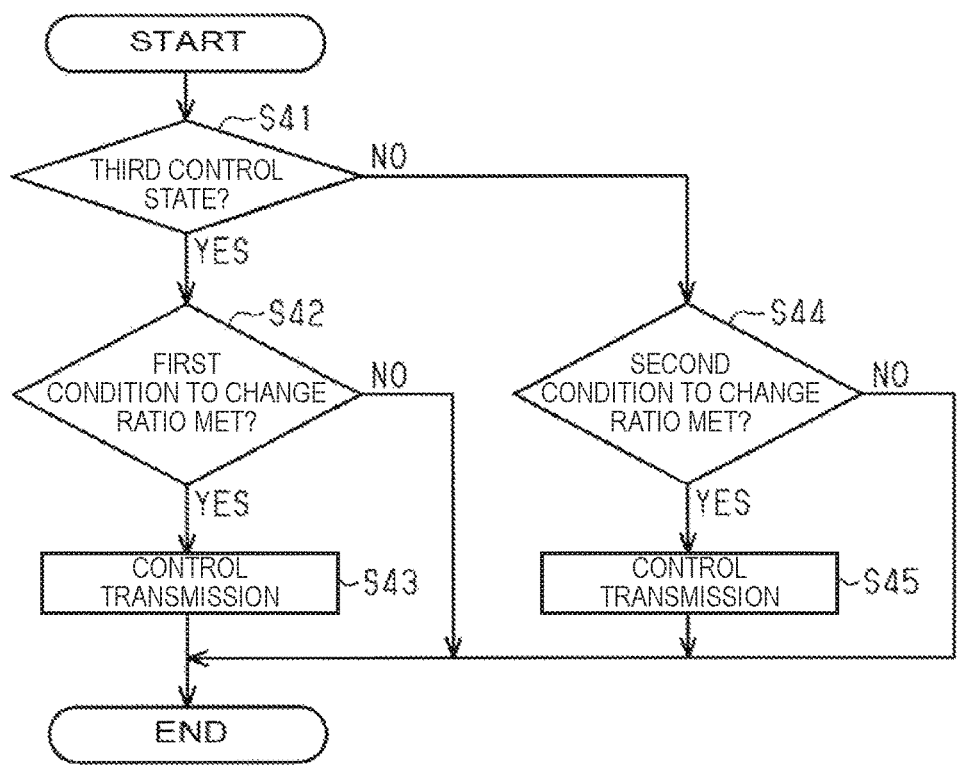
FIG. 6 is a flow chart of the process for controlling the transmission in the second control state that is executed by the controller of the second embodiment.

The control device 50 of the second embodiment will be described with reference to FIGS. 2, 5, and 6. Except for the fact that the controller 52 switches between the third control state and the fourth control state, the control device 50 according to the second embodiment is the same as the control device 50 according to the first embodiment; therefore, the configurations that are common to the first embodiment have been assigned the same codes as the first embodiment, and the descriptions thereof will be omitted.

The controller 52 is configured to switch the control state of the transmission 34 from the third control state to the fourth control state in accordance with at least one of the following by means of detection unit 62: human drive force H that is input to the human-powered vehicle 10, the rider's posture, the attitude of the vehicle body 12 of the human-powered vehicle 10, the force applied to the handle 22A of the human-powered vehicle 10, and the travel state of the human-powered vehicle 10. In the third control state, the controller 52 controls the transmission 34 to change the ratio R in accordance with at least one of the travel state of the human-powered vehicle 10 and the travel environment of the human-powered vehicle 10. In the fourth control state, the controller 52 controls the transmission 34 such that is becomes easier for the ratio R to increase than if the controller is in the third control state, in accordance with at least one of the travel state of the human-powered vehicle 10 and the travel environment of the human-powered vehicle 10. The configuration of the controller 52 can be such that, in the third control state, the ratio R can be changed, in addition to in accordance with the travel state of the human-powered vehicle 10 and the travel environment of the human-powered vehicle 10, by means of an operation of the shift operating unit 38.

In the third control state, if a first condition to change the ratio R, which is related to the parameter P, which is related to the travel state of the human-powered vehicle 10 and the travel environment of the human-powered vehicle 10, is satisfied, the controller 52 controls the transmission 34 to change the ratio R. In the fourth control state, if a second condition to change the ratio R, which is related to the parameter P, which is related to the travel state of the human-powered vehicle 10 and the travel environment of the human-powered vehicle 10, is satisfied, the controller 52 controls the transmission 34 to change the ratio R.

In the third control state, the controller 52 changes the ratio R to be within a first range in accordance with the parameter P, which is related to at least one of the travel state of the human-powered vehicle 10 and the travel environment of the human-powered vehicle 10, and, in the fourth control state, the controller changes the ratio R to be within a second threshold range, which differs from the first range in accordance with the parameter P.

The parameter P, which is used as the first condition to change the ratio R of the third control state and as the second condition to change the ratio R of the fourth control state, includes the human drive force H and/or the gradient of the road surface on which the human-powered vehicle 10 travels.

In the third control state, for the case in which the parameter P includes the rotational speed N of the crank 14, if the rotational speed N of the crank 14 exceeds an upper limit value of a first range, the controller 52 controls the transmission 34 such that the ratio R increases, and if the rotational speed N of the crank 14 goes below a lower limit value of the first range, the controller controls the transmission 34 such that the ratio R decreases. In the fourth control state, for the case in which the parameter P includes the rotational speed N of the crank 14, if the rotational speed N of the crank 14 exceeds an upper limit value of a second range, the controller 52 controls the transmission 34 such that the ratio R increases, and if the rotational speed N of the crank 14 goes below a lower limit value of the second range, the controller controls the transmission 34 such that the ratio R decreases. For this case, the control device 50 preferably includes the crank rotation sensor 56. For this case, the upper limit value of the second range is preferably less than the upper limit value of the first range. The lower limit value of the second range can be less than the lower limit value of the first range or can be greater than or equal to the lower limit value of the first range.

In the third control state, for the case in which the parameter P includes the torque HT of the human drive force H, if the torque HT exceeds the upper limit value of a first range, the controller 52 controls the transmission 34 such that the ratio R decreases, and if the torque HT goes below the lower limit value of the first range, the controller controls the transmission 34 such that the ratio R increases. In the fourth control state, for the case in which the parameter P includes the torque HT of the human drive force H, if the torque HT exceeds the upper limit value of a second range, the controller 52 controls the transmission 34 such that the ratio R decreases, and if the torque HT goes below the lower limit value of the second range, the controller controls the transmission 34 such that the ratio R increases. For this case, the control device 50 preferably includes the torque sensor 58. For this case, the lower limit value of the second range is preferably less than the lower limit value of the first range. The upper limit value of the second range can be less than the upper limit value of the first range or can be greater than or equal to the upper limit value of the first range.

In the third control state, for the case in which the parameter P includes the road surface gradient, if the road surface gradient exceeds the upper limit value of a first range, the controller 52 controls the transmission 34 such that the ratio R decreases, and if the road surface gradient is below the lower limit value of the first range, the controller controls the transmission 34 such that the ratio R increases. In the fourth control state, for the case in which the parameter P includes the road surface gradient, if the road surface gradient exceeds the upper limit value of a second range, the controller 52 controls the transmission 34 such that the ratio R decreases, and if the road surface gradient is below the lower limit value of the second range, the controller controls the transmission 34 such that the ratio R increases. For this case, the control device 50 preferably includes the gradient sensor 60. For this case, the lower limit value of the second range is preferably less than the lower limit value of the first range. The upper limit value of the second range can be less than the upper limit value of the first range or can be greater than or equal to the upper limit value of the first range.

The controller 52, if in the third control state, switches from the third control state to the fourth control state if a condition to switch to the fourth control state is met. The condition for switching to the fourth control state preferably includes the same condition as the condition for switching to the second control state of the first embodiment.

In the first example, the condition for switching to the fourth control state is related to the human drive force H that is input to the human-powered vehicle 10. If the human drive force H becomes greater than or equal to the first prescribed value HX and the value related to the amount of change DH in the human drive force H becomes greater than or equal to the second prescribed value DHX, then the controller 52 switches from the third control state to the fourth control state. The human drive force H includes at least one of the rotational speed N of the crank 14, the torque HT of the human drive force H, and the work rate HW of the human drive force H. The value related to the amount of change DH in the human drive force H includes the amount of change DH and the values obtained by calculating the first or higher time derivative of the amount of change DH. For this case, the detection unit 62 preferably includes the first detection unit 64, which can detect the human drive force H. The first prescribed value HX is set to an appropriate value for each of the rotational speed N of the crank 14, the torque HT of the human drive force H, and the work rate HW of the human drive force H. The second prescribed value DHX is set to an appropriate value for each of the amount of change DH of the rotational speed N of the crank 14, the amount of change DH in the torque HT of the human drive force H, and the amount of change DH in the work rate HW of the human drive force H. Preferably, the first prescribed value HX and the second prescribed value DHX are set to values for determining cases in which the rider intends to ride the human-powered vehicle 10 at high exercise load.

In the second example, the condition for switching to the fourth control state is related to the rider's posture. The controller 52 switches from the third control state to the fourth control state if the rider changes from the in-saddle posture to the out-of-saddle posture. In this case, the detection unit 62 preferably includes the second detection unit 66 that can detect the parameter Q that changes according to the rider's posture. In the third control state, if the parameter Q changes to a value that corresponds to the out-of-saddle posture, the controller 52 determines that the rider has switched from the in-saddle posture to the out-of-saddle posture. More preferably, in the third control state, if the parameter Q takes on a value that corresponds to the out-of-saddle posture and a value that indicates that the rider intends to drive the human-powered vehicle 10 at high exercise load, the controller 52 switches from the third control state to the fourth control state.

In the third example, the condition for switching to the fourth control state is related to the attitude of the vehicle body 12 of the human-powered vehicle 10. The attitude of the vehicle body 12 of the human-powered vehicle 10 includes the roll angle D of the vehicle body 12, wherein, if the amount of change DD in the roll angle D of the vehicle body 12 becomes greater than or equal to the first amount of change DDX, the controller 52 switches from the third first control state to the fourth control state. For this case, the detection unit 62 preferably includes the third detection unit 68 for detecting the roll angle D of the vehicle body 12.

In the fourth example, the condition for switching to the fourth control state includes the force that is applied to the handle 22A of the human-powered vehicle 10. If the force S that is applied to the handle 22A of the human-powered vehicle 10 and that is oriented rearward of the human-powered vehicle 10 becomes greater than or equal to a third prescribed value SX, then the controller 52 switches from the third control state to the fourth control state. For this case, the detection unit 62 preferably includes the fourth detection unit 70 for detecting the force S that is applied to the handle 22A and that is oriented rearward of the human-powered vehicle 10.

In the fifth example, the condition for switching to the fourth control state includes the travel state of the human-powered vehicle 10. The travel state of the human-powered vehicle 10 includes the acceleration A of the human-powered vehicle 10, wherein, if the acceleration A of the human-powered vehicle 10 becomes greater than or equal to a fourth prescribed value AX and if the value DA that is related to the acceleration A becomes greater than or equal to a fifth prescribed value DAX, the controller 52 switches from the third control state to the fourth control state. The value DA related to the acceleration A includes, for example, a value obtained by differentiating the acceleration A with time one or more times. In this case, the detection unit 62 preferably includes the fifth detection unit 72 for detecting the acceleration A.

While in the fourth control state, controller 52 can be configured to switch from the second control state to the first control state if the condition for switching to the third control state is met. The condition for switching to the third control state preferably includes the same condition as the condition for switching to the third control state of the first embodiment.

In one example, in the fourth control state, if the shift operating unit 38, which can be operated by the rider, is operated to change the ratio R, the controller 52 switches from the fourth control state to the third control state.

In another example, in the fourth control state, the controller 52 switches from the fourth control state to the third control state in accordance with a parameter related to at least one of time, distance, position, speed V, and the rotational speed of the crank 14. More specifically, the controller 52 switches from the fourth control state to the third control state in accordance with at least one of the following: the time that has elapsed since the control state was switched from the third control state to the fourth control state, the distance that the human-powered vehicle 10 has traveled since the control state was switched from the third control state to the fourth control state, the amount of movement in the position of the human-powered vehicle 10 since the control state was switched from the third control state to the fourth control state, the position of the human-powered vehicle 10 based on geographical coordinates, the speed V of the human-powered vehicle 10, and the rotational speed N of the crank 14.

The process for switching between the third control state and the fourth control state will be described with reference to FIG. 5. If electric power is supplied to the controller 52 from the battery 40, then the controller 52 initiates the process and proceeds to Step S31 of the flow chart shown in FIG. 5. The controller 52 executes the process from Step S31 each prescribed cycle as long as the electric power is being supplied.

In Step S31, it is determined whether the controller 52 is in the third control state. If it is determined that the controller 52 is in the third control state, then the process proceeds to Step S32. In Step S32, the controller 52 determines whether the condition for switching to the fourth control state is met. If the condition for switching to the fourth control state is not met, then the controller 52 ends the process. If the condition for switching to the fourth control state is met, then the controller 52 proceeds to Step S33. In Step S33, the controller 52 switches to the fourth control state and ends the process.

If it is determined that the controller 52 is not the third control state in Step S31, then the process proceeds to Step S34. In Step S34, the controller 52 determines whether the condition for switching to the third control state is met. If the condition for switching to the third control state is not met, then the controller 52 ends the process. If the condition for switching to the third control state is met, then the controller 52 proceeds to Step S35. In Step S35, the controller 52 switches to the third control state and ends the process.

The process for changing the ratio R in the third control state and the fourth control state will now be described with reference to FIG. 6. If electric power is supplied to the controller 52 from the battery 40, then the controller 52 initiates the process and proceeds to Step S41 of the flow chart shown in FIG. 6. The controller 52 executes the process from Step S41 each prescribed cycle as long as the electric power is being supplied.

In Step S41, it is determined whether the controller 52 is in the third control state. If the controller 52 is in the third control state, then the process proceeds to Step S42. In Step S42, the controller 52 determines whether the first condition to change the ratio R has been met. If the first condition to change the ratio R is not met, then the controller 52 ends the process. If the first condition to change the ratio R is met, then the controller 52 proceeds to Step S43. In Step S43, the controller 52 controls the transmission 34 and ends the process.

If it is determined that the controller 52 is not the third control state in Step S41, then the process proceeds to Step S44. In Step S44, the controller 52 determines whether the second condition to change the ratio R has been met. If the second condition to change the ratio R has not been met, then the controller 52 ends the process. If the second condition to change the ratio R has been met, then the controller 52 proceeds to Step S45. In Step S45, the controller 52 controls the transmission 34 and ends the process.

Third Embodiment

Figure 7:
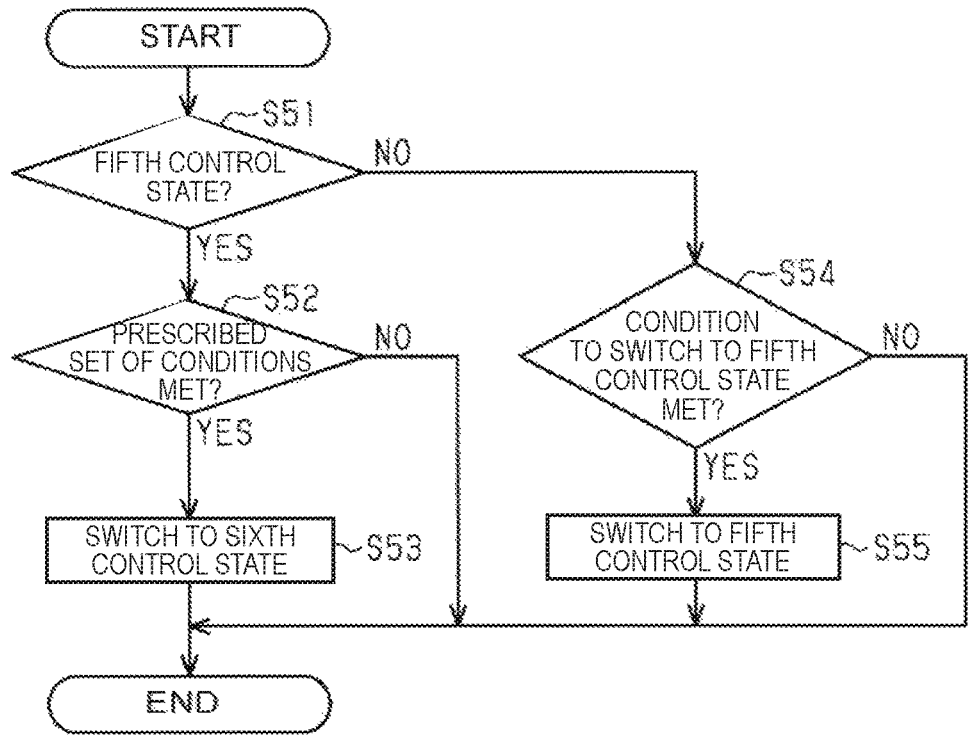
FIG. 7 is a flow chart of the control process for switching between the first control state and the second control state executed by the controller of a third embodiment.
Figure 8:
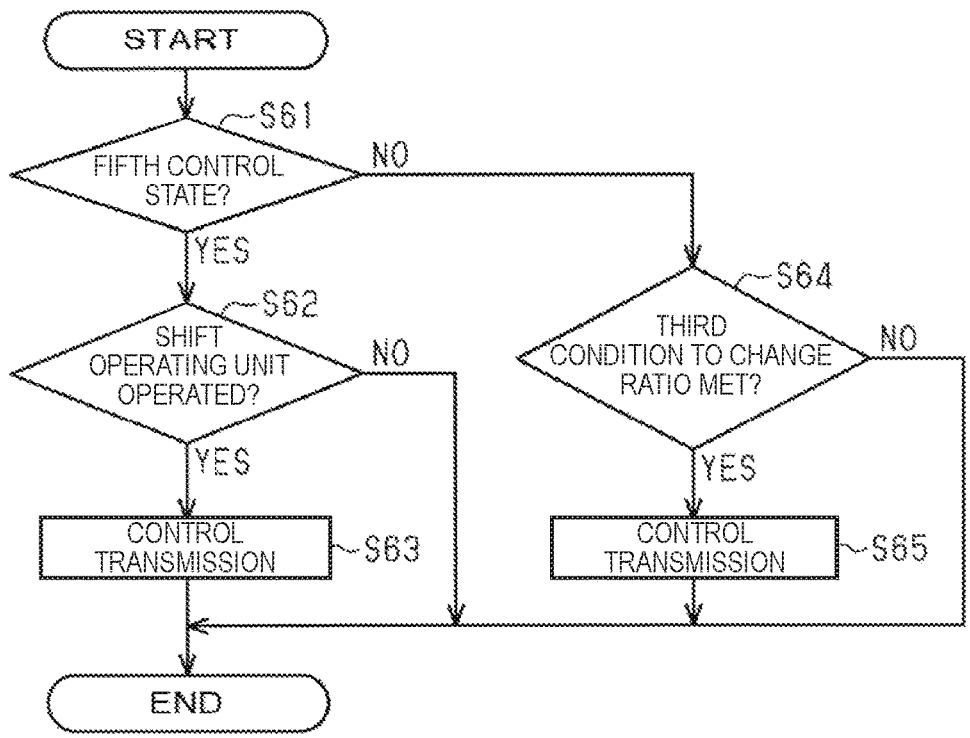
FIG. 8 is a flow chart of the control process for controlling the transmission in the second control state that is executed by the controller of the third embodiment.

The control device 50 of the third embodiment will now be described with reference to FIGS. 2, 7, and 8. Except for the fact that the controller 52 switches between the fifth control state and the sixth control state, the control device 50 according to the third embodiment is the same as the control device 50 according to the first embodiment; therefore, the configurations that are common to the first embodiment have been assigned the same codes as the first embodiment, and the descriptions thereof will be omitted.

The controller 52 is configured to switch the control state of the transmission 34 from the fifth control state to the sixth control state. In the fifth control state, the controller 52 controls the transmission 34 to change the ratio R in accordance with an operation of the shift operating unit 38 that can be operated by the rider to change the ratio R. In the sixth control state, the controller 52 controls the transmission 34 to change the ratio R irrespective of the operation of the shift operating unit 38. The controller 52 switches from the fifth control state to the sixth control state in accordance with a prescribed set of conditions, irrespective of the operation of the operating unit that can be operated by the rider. Preferably, the human-powered vehicle 10 does not include an operating unit for switching from the fifth control state to the sixth control state. The human-powered vehicle 10 can include an operating unit for switching from the fifth control state to the sixth control state. In that case, even if the operating unit is not operated, the controller 52 switches from the fifth control state to the sixth control state in accordance with the prescribed set of conditions. In the case in which the human-powered vehicle 10 includes the operating unit for switching from the fifth control state to the sixth control state, the operating unit can be provided in a cycle computer, for example.

In the sixth control state, the controller 52 controls the transmission 34 to change the ratio R in accordance with the travel state of the human-powered vehicle 10 and the travel environment of the human-powered vehicle 10. The third condition for changing the ratio R of the human-powered vehicle 10 in the sixth control state preferably includes the same condition for changing the ratio R in the second control state of the first embodiment, the first condition for changing the ratio R in the third control state of the second embodiment, and the second condition for controlling the ratio R in the fourth control state of the second embodiment.

The prescribed set of conditions can include the same condition as the condition for switching to the second control state of the first embodiment or include other conditions. The prescribed set of conditions includes, for example, a condition with which it is possible to determine a situation in which the rider feels that operating the shift operating unit 38 is troublesome. One example of a situation in which the rider can feel that operating the shift operating unit 38 is troublesome is the case in which the rider intends to drive the human-powered vehicle 10 at high exercise load.

In the sixth control state, if the condition for switching to the fifth control state is met, the controller 52 switches from the sixth control state to the fifth control state. The condition for switching to the fifth control state preferably includes the same condition as the condition for switching to the first control state in the first embodiment. For example, in the sixth control state, the controller 52 switches from the sixth control state to the fifth control state in accordance with a parameter related to at least one of time, distance, position, speed V, and the rotational speed of the crank 14.

The process for switching between the fifth control state and the sixth control state will now be described with reference to FIG. 7. If electric power is supplied to the controller 52 from the battery 40, then the controller 52 initiates the process and proceeds to Step S51 of the flow chart shown in FIG. 7. The controller 52 executes the process from Step S51 each prescribed cycle as long as electric power is being supplied.

In Step S51, it is determined whether the controller 52 is in the fifth control state. If the controller 52 is in the fifth control state, then the process proceeds to Step S52. In Step S52, the controller 52 determines whether the prescribed set of conditions is met. If the prescribed set of conditions is not met, then the controller 52 ends the process. If the prescribed set of conditions is met, then the controller 52 proceeds to Step S53. In Step S53, the controller 52 switches to the sixth control state and ends the process.

If it is determined that the controller 52 is not the fifth control state in Step S51, then the process proceeds to Step S54. In Step S54, the controller 52 determines whether the condition for switching to the fifth control state is met. If the condition for switching to the fifth control state is not met, then the controller 52 ends the process. If the condition for switching to the fifth control state is met, then the controller 52 proceeds to Step S55. In Step S55, the controller 52 switches to the fifth control state and ends the process.

The process for changing the ratio R in the fifth control state and the sixth control state will be described with reference to FIG. 8. If electric power is supplied to the controller 52 from the battery 40, then the controller 52 initiates the process and proceeds to Step S61 of the flow chart shown in FIG. 8. The controller 52 executes the process from Step S61 each prescribed cycle as long as electric power is being supplied.

In Step S61, it is determined whether the controller 52 is in the fifth control state. If the controller 52 is in the fifth control state, then the process proceeds to Step S62. In Step S62, the controller 52 determines whether the shift operating unit 38 has been operated. If the shift operating unit 38 has not been operated, the controller 52 ends the process. If the shift operating unit 38 has been operated, then the controller 52 proceeds to Step S63. In Step S63, the controller 52 controls the transmission 34 and ends the process. Specifically, the transmission 34 is controlled so as to correspond to the content of the operation of the shift operating unit 38.

If it is determined that the controller 52 is not the fifth control state in Step 611, then the process proceeds to Step S64. In Step S64, the controller 52 determines whether the third condition for changing the ratio R has been met. If the third condition for changing the ratio R has not been met, then the controller 52 ends the process. If the third condition for changing the ratio R has been met, then the controller 52 proceeds to Step S65. In Step S65, the controller 52 controls the transmission 34 and ends the process.

Fourth Embodiment

Figure 9:
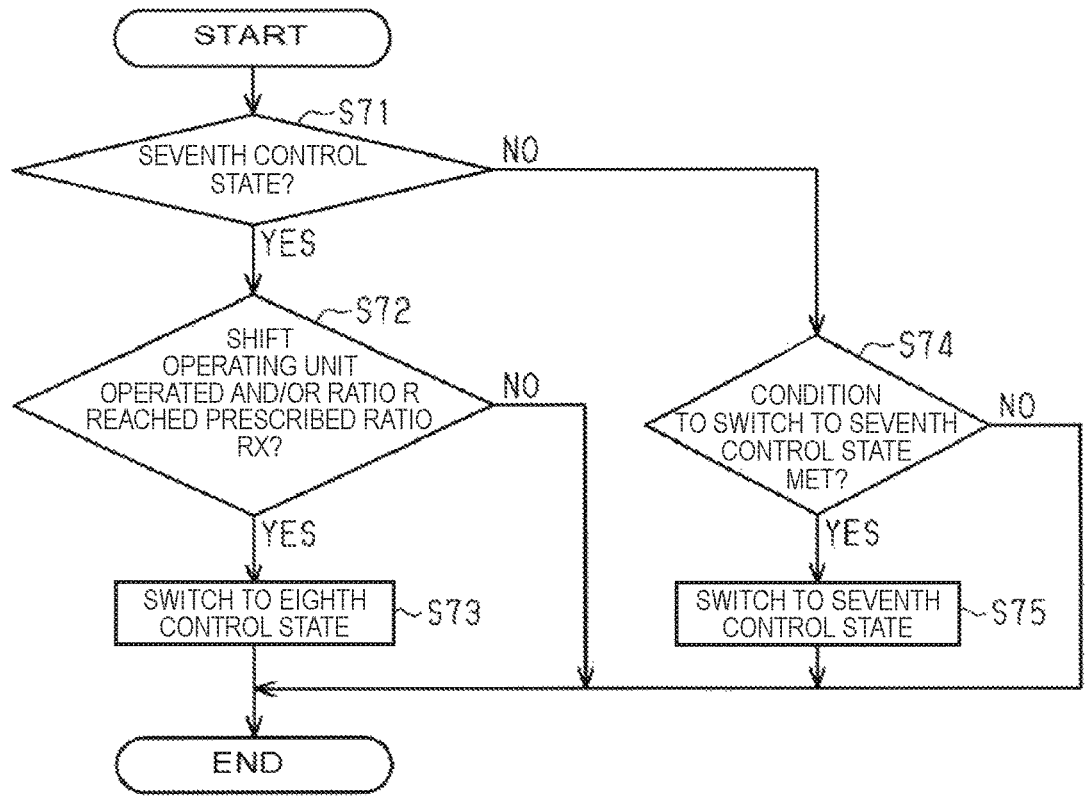
FIG. 9 is a flow chart of the control process for switching between the first control state and the second control state executed by the controller of a fourth embodiment.
Figure 10:
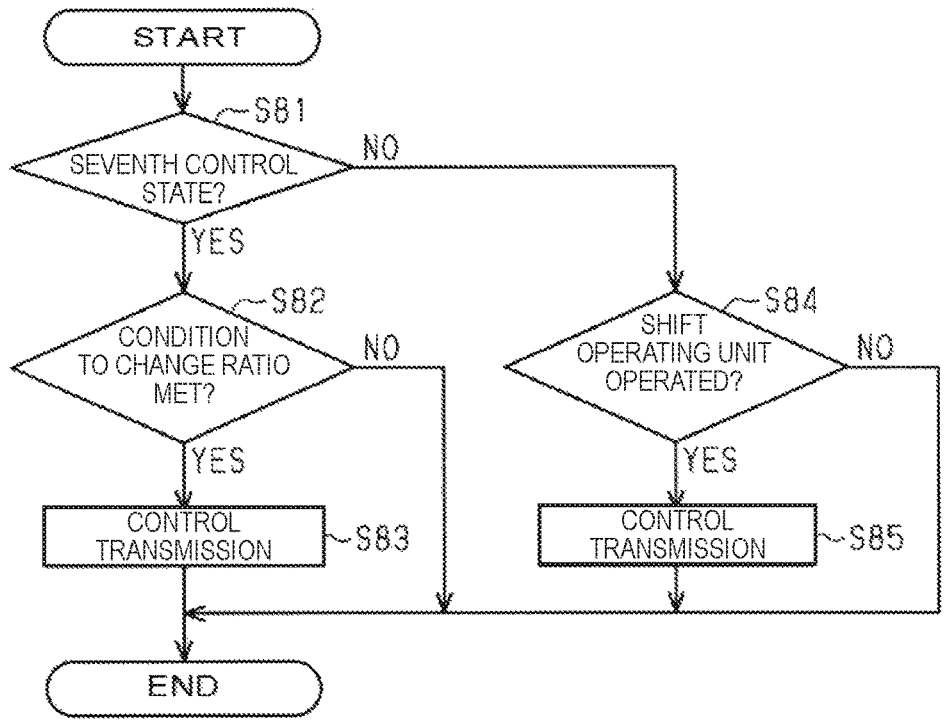
FIG. 10 is a flow chart of the control process for controlling the transmission in the second control state that is executed by the controller of the fourth embodiment.

The control device 50 of the fourth embodiment will now be described with reference to FIGS. 2, 9, and 10. Except for the fact that the controller 52 switches between the seventh control state and the eighth control state, the control device 50 according to the fourth embodiment is the same as the control device 50 according to the first embodiment; therefore, the configurations that are common to the first embodiment have been assigned the same codes as the first embodiment, and the descriptions thereof will be omitted.

If the shift operating unit 38, which can be operated by the rider, is operated to change the ratio R and/or if the ratio R reaches a prescribed ratio RX, then the controller 52 is configured to switch from the seventh control state to the eighth control state. In the seventh control state, the controller 52, irrespective of an operation of the shift operating unit 38, controls the transmission 34 to change in either a direction in which the ratio R increases or a direction in which the ratio decreases in accordance with at least one of the travel state of the human-powered vehicle 10 and the travel environment of the human-powered vehicle 10. If controlling the transmission 34 to change in the direction in which the ratio R increases in the seventh control state, then the controller 52 does not control the transmission 34 to change in the direction in which the ratio R decreases, in accordance with at least one of the travel state of the human-powered vehicle 10 and the travel environment of the human-powered vehicle 10 irrespective of the operation of the shift operating unit 38, until the shift operating unit 38 is operated and/or the ratio R has reached the prescribed ratio RX. If controlling the transmission 34 to change in the direction in which the ratio R decreases in the seventh control state, then the controller 52 does not control the transmission 34 to change in the direction in which the ratio R increases, in accordance with at least one of the travel state of the human-powered vehicle 10 and the travel environment of the human-powered vehicle 10 irrespective of the operation of the shift operating unit 38, until the shift operating unit 38 is operated and/or the ratio R has reached the prescribed ratio RX.

If the shift operating unit 38, which can be operated by the rider, is operated to change the ratio R and/or if the ratio R reaches a prescribed ratio RX, then the controller 52 is configured to switch from the seventh control state to the eighth control state. In the seventh control state, the controller 52, in accordance with at least one of the travel state of the human-powered vehicle 10 and the travel environment of the human-powered vehicle 10 and irrespective of an operation of the shift operating unit 38, controls the transmission 34 to change in either a direction in which the ratio R increases or a direction in which the ratio decreases. In the seventh control state, in accordance with at least one of the travel state of the human-powered vehicle 10 and the travel environment of the human-powered vehicle 10 and irrespective of the operation of the shift operating unit 38, the transmission 34 is controlled to change in the direction in which the ratio R increases until the shift operating unit 38 is operated and/or the ratio R has reached the prescribed ratio RX, and the controller 52 does not control the transmission 34 to change in the direction in which the ratio R decreases. In the seventh control state, the controller 52, in accordance with at least one of the travel state of the human-powered vehicle 10 and the travel environment of the human-powered vehicle 10 and irrespective of the operation of the shift operating unit 38, the transmission 34 is controlled to change in the direction in which the ratio R decreases until the shift operating unit 38 is operated and/or the ratio R has reached the prescribed ratio RX, and the controller 52 does not control the transmission 34 to change in the direction in which the ratio R increases.

The prescribed ratio RX is either the largest ratio R or the smallest ratio R that the transmission 34 can assume. The largest ratio R that the transmission 34 can assume is the maximum transmission ratio of a combination of a plurality of the transmissions 34 if the human-powered vehicle 10 includes a plurality of transmissions 34 and the controller 52 controls the plurality of the transmissions 34. The largest ratio R that the transmission 34 can assume can be the maximum transmission ratio of one transmission 34 from among the plurality of the transmissions 34, even if the human-powered vehicle 10 includes a plurality of the transmissions 34. In this case, in the seventh control state, the controller 52, in accordance with at least one of the travel state of the human-powered vehicle 10 and the travel environment of the human-powered vehicle 10, and irrespective of an operation of the shift operating unit 38, controls the transmission 34, from among the plurality of the transmissions 34, to change in a direction in which the ratio R of one transmission 34 increases, and switches from the seventh control state to the eighth control state if the transmission 34 reaches the maximum transmission ratio. The largest ratio R that the transmission 34 can assume is the minimum transmission ratio of a combination of the plurality of transmissions 34 if the human-powered vehicle 10 includes a plurality of the transmissions 34. The smallest ratio R that the transmission 34 can assume can be the minimum transmission ratio of one transmission 34 from among the plurality of the transmissions 34, even if the human-powered vehicle 10 includes a plurality of the transmissions 34. In this case, in the seventh control state, the controller 52, in accordance with at least one of the travel state of the human-powered vehicle 10 and the travel environment of the human-powered vehicle 10, and irrespective of an operation of the shift operating unit 38, controls the transmission 34, from among the plurality of the transmissions 34, to change in a direction in which the ratio R of one transmission 34 decreases, and switches from the seventh control state to the eighth control state if the transmission 34 reaches the minimum transmission ratio.

In the seventh control state, if the transmission 34 is controlled to change in a direction in which the ratio R increases, the controller 52 switches to the eighth control state if the ratio R reaches the largest ratio R that the transmission 34 can assume.

In the seventh control state, if the transmission 34 is controlled to change in a direction in which the ratio R decreases, the controller 52 switches to the eighth control state if the ratio R reaches the smallest ratio R that the transmission 34 can assume.

The controller 52 is configured to switch from the ninth control state to the seventh control state in accordance with at least one of the human drive force that is input to the human-powered vehicle 10, the rider's posture, the attitude of the vehicle body 12 of the human-powered vehicle 10, the force applied to the handle 22A of the human-powered vehicle 10, and the travel state of the human-powered vehicle 10. In the ninth control state, the controller 52 controls the transmission 34 to change the ratio R in accordance with the operation of the shift operating unit 38. Preferably, the ninth control state is the eighth control state.

The ninth control state and the eighth control state are preferably the same control states as the first control state of the first embodiment. The seventh control state is preferably the same control state as the second control state of the first embodiment. The eighth control state can be the same control state as the third control state of the second embodiment. For this case, in the eighth control state, the controller 52 can control the transmission 34 to change the ratio R in accordance with at least one of the travel state of the human-powered vehicle 10 and the travel environment of the human-powered vehicle 10, and irrespective of the operation of the shift operating unit 38. In addition, in the eighth control state, the controller 52 can control the transmission 34 to change the ratio R in accordance with at least one of the travel state of the human-powered vehicle 10 and the travel environment of the human-powered vehicle 10, as well as with an operation of the shift operating unit 38.

The condition for switching from the seventh control state to the eighth control state preferably includes the same condition as the condition for switching from the second control state to the first control state of the first control state of the first embodiment. The condition for switching from the eighth control state to the seventh control state and the condition for switching from the ninth control state to the seventh control state preferably include the same condition as the condition for switching from the first control state to the second control state in the first embodiment.

The process for switching between the seventh control state and the eighth control state will be described with reference to FIG. 9. If electric power is supplied to the controller 52 from the battery 40, then the controller 52 initiates the process and proceeds to Step S71 of the flow chart shown in FIG. 9. The controller 52 executes the process from Step S71 each prescribed cycle as long as electric power is being supplied.

In Step S71, it is determined whether the controller 52 is in the seventh control state. If the controller 52 is in the seventh control state, then the process proceeds to Step S72. In Step S72, the controller 52 determines whether the shift operating unit 38 has been operated and/or whether the ratio R has reached the prescribed ratio RX. If the shift operating unit 38 has not been operated and the ratio R has not reached the prescribed ratio RX, then the controller 52 ends the process.

If the shift operating unit 38 has been operated and/or the ratio R has reached the prescribed ratio RX in Step S72, then the controller 52 the controller 52 proceeds to Step S73. In Step S73, the controller 52 switches to the eighth control state and ends the process.

In Step S72, the controller 52 can be configured to proceed to Step S73 if the shift operating unit 38 is operated, configured to proceed to Step S73 if the ratio R reaches the largest ratio R that the human-powered vehicle 10 can assume, or configured to proceed to Step S73 if the ratio R reaches the smallest ratio R that the human-powered vehicle 10 can assume.

If it is determined that the controller 52 is not in the seventh control state in Step S71, then the process proceeds to Step S74. In Step S74, the controller 52 determines whether the condition for switching to the seventh control state is met. If the condition for switching to the seventh control state is not met, then the controller 52 ends the process. If the condition for switching to the seventh control state is met, then the controller 52 proceeds to Step S55. In Step S75, the controller 52 switches to the seventh control state and ends the process.

The process for changing the ratio R in the seventh control state and the eighth control state will be described with reference to FIG. 10. If electric power is supplied to the controller 52 from the battery 40, then the controller 52 initiates the process and proceeds to Step S81 of the flow chart shown in FIG. 10. The controller 52 executes the process from Step S81 each prescribed cycle as long as electric power is being supplied.

In Step S81, it is determined whether the controller 52 is in the seventh control state. If the controller 52 is in the seventh control state, then the process proceeds to Step S82.

In Step S82, the controller 52 determines whether a condition to change the ratio R has been met. then the condition to change the ratio R is not met, the controller 52 ends the process. If the condition to change the ratio R is met, the controller 52 proceeds to Step S83. In Step S83, the controller 52 controls the transmission 34 and ends the process.

If it is determined that the controller 52 is not in the seventh control state in Step S81, then the process proceeds to Step S84. In Step S84, the controller 52 determines whether the shift operating unit 38 has been operated. If the shift operating unit 38 has not been operated, then the controller 52 ends the process. If the shift operating unit 38 has been operated, then the controller 52 proceeds to Step S84. In Step S85, the controller 52 controls the transmission 34 and ends the process. Specifically, the transmission 34 is controlled so as to correspond to the content of the operation of the shift operating unit 38.

MODIFICATIONS

The descriptions related to the above-described embodiments are examples of forms that the human-powered vehicle control device according to the present invention may assume, and are not intended to limit the forms thereof. The human-powered vehicle control device according to the present invention may assume the forms of the modified examples of the above-described embodiment shown below, as well as forms that combine at least two modified examples that are not mutually contradictory. In the following modified examples, the portions common to the embodiment have been assigned the same reference symbols as the embodiment, and the descriptions thereof will be omitted. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

In the second control state of the first embodiment, the fourth control state of the second embodiment, the sixth control state of the third embodiment, and the seventh control state of the fourth embodiment, the transmission 34 can be controlled to change the ratio R in accordance with an operation of the shift operating unit 38. In the second control state of the first embodiment, the fourth control state of the second embodiment, the sixth control state of the third embodiment, and the seventh control state of the fourth embodiment, for the case in which the controller 52 controls the transmission 34 such that the ratio R increases irrespective of the operation of the shift operating unit 38, the control state can be switched if the shift operating unit 38 is operated to decrease the ratio R. In the seventh control state of the fourth embodiment, for the case in which the controller 52 controls the transmission 34 such that the ratio R decreases irrespective of the operation of the shift operating unit 38, the control state can be switched if the shift operating unit 38 is operated to increase the ratio R.

In the second control state of the first embodiment and the fourth control state of the second embodiment, the controller 52 can control the transmission 34 to decrease the ratio R if the parameter P become less than or equal to the second value.

The second condition to change the ratio R in the fourth control state of the second embodiment can include the same condition as the condition to change the ratio R in the second control state of the first embodiment. In this case, the controller 52 decreases the ratio R if the parameter P of the first condition to change the ratio R of the third control state exceeds the upper limit value of the first range, and increases the ratio R if the parameter P of the second condition to change the ratio R of the fourth control state becomes greater than or equal to the first value. Accordingly, the ratio R tends to be larger in the fourth control state than in the third control state.

In the second embodiment, the controller 52 can be configured to cause the notification unit 74 to report switching between the third control state and the fourth control state.

In the third embodiment, the controller 52 can be configured to cause the notification unit 74 to report switching between the fifth control state and the sixth control state.

In the fourth embodiment, the controller 52 can be configured to cause the notification unit 74 to report switching between the seventh control state and the eighth control state.

What is claimed is:

1. A human-powered vehicle control device comprising:
    an electronic controller configured to control a transmission that changes a ratio of a rotational speed of a drive wheel to a rotational speed of a crank of a human-powered vehicle,
    the electronic controller being configured to switch a control state of the transmission from a first control state to a second control state upon satisfaction of a switching condition related to at least one of a human drive force that is input to the human-powered vehicle, a rider's posture, an attitude of a vehicle body of the human-powered vehicle, a force applied to a handle of the human-powered vehicle, and a travel state of the human-powered vehicle,
    the electronic controller being configured to control the transmission to change the ratio in accordance with operation of a shift operating unit that can be operated by a rider to change the ratio while in the first control state, and
    the electronic controller being configured to control the transmission such that the ratio increases in accordance with at least one of the travel state of the human-powered vehicle and a travel environment of the human-powered vehicle and irrespective of an operation of the shift operating unit while in the second control state.

2. The human-powered vehicle control device according to claim 1, wherein
    the electronic controller is configured to switch from the first control state to the second control state upon determining the human drive force becomes greater than or equal to a first prescribed value and a value related to an amount of change in the human drive force becomes greater than or equal to a second prescribed value,
    the human drive force including at least one of the rotational speed of the crank, a torque of the human drive force, and a work rate of the human drive force.

3. The human-powered vehicle control device according to claim 1, wherein
    the electronic controller is configured to switch from the first control state to the second control state upon determining the rider's posture switches from an in-saddle posture to an out-of-saddle posture.

4. The human-powered vehicle control device according to claim 1, wherein
    the attitude of the vehicle body of the human-powered vehicle includes a roll angle of the vehicle body, and
    the electronic controller is configured to switch from the first control state to the second control state upon determining an amount of change in the roll angle of the vehicle body becomes greater than or equal to a first amount of change.

5. The human-powered vehicle control device according to claim 1, wherein
    the electronic controller is configured to switch from the first control state to the second control state upon determining the force, which is applied to the handle of the human-powered vehicle, is oriented rearward of the human-powered vehicle and becomes greater than or equal to a third prescribed value.

6. The human-powered vehicle control device according to claim 1, wherein
    the travel state of the human-powered vehicle includes an acceleration of the human-powered vehicle, and
    the electronic controller is configured to switch from the first control state to the second control state upon determining the acceleration becomes greater than or equal to a fourth prescribed value and upon determining a value related to the acceleration becomes greater than or equal to a fifth prescribed value.

7. The human-powered vehicle control device according to claim 1, wherein the electronic controller is configured to switch from the second control state to the first control state upon determining the shift operating unit is operated while in the second control state.

8. The human-powered vehicle control device according to claim 1, wherein
the electronic controller is configured to switch from the second control state to the first control state in accordance with a parameter related to at least one of time, distance, position, speed, and the rotational speed of the crank while in the second control state.

9. The human-powered vehicle control device according to claim 1, wherein
the electronic controller is configured to control a notification unit to notify the rider that the switch has been made in the control state of the transmission.

10. The human-powered vehicle control device according to claim 1, further comprising
a storage unit, which changeably stores the switching condition.

11. A human-powered vehicle control device comprising:
an electronic controller that is configured to control a transmission that changes a ratio of a rotational speed of a drive wheel to a rotational speed of a crank of a human-powered vehicle,
the electronic controller being configured to switch a control state of the transmission from a third control state to a fourth control state upon satisfaction of a switching condition related to an output of a detection unit for detecting at least one of a human drive force that is input to the human-powered vehicle, a rider's posture, an attitude of a vehicle body of the human-powered vehicle, a force applied to a handle of the human-powered vehicle, and a travel state of the human-powered vehicle,
the electronic controller being configured to control the transmission to change the ratio in accordance with at least one of the travel state of the human-powered vehicle and a travel environment of the human-powered vehicle while in the third control state, and
the electronic controller being configured to control the transmission such that the ratio tends to become larger than in the third control state in accordance with at least one of the travel state of the human-powered vehicle and the travel environment of the human-powered vehicle while in the fourth control state.

12. The human-powered vehicle control device according to claim 11, wherein
the electronic controller is configured to switch from the third control state to the fourth control state upon determining the human drive force becomes greater than or equal to a first prescribed value and a value related to an amount of change in the human drive force becomes greater than or equal to a second prescribed value, and
the human drive force includes at least one of the rotational speed of the crank, a torque of the human drive force, and a work rate of the human drive force.

13. The human-powered vehicle control device according to claim 11, wherein
the electronic controller is configured to switch from the third control state to the fourth control state upon determining the rider's posture switches from an in-saddle posture to an out-of-saddle posture.

14. The human-powered vehicle control device according to claim 11, wherein the attitude of the vehicle body of the human-powered vehicle includes a roll angle of the vehicle body, and
the electronic controller is configured to switch from the third control state to the fourth control state upon determining an amount of change in the roll angle of the vehicle body becomes greater than or equal to a first amount of change.

15. The human-powered vehicle control device according to claim 11, wherein
the electronic controller switches from the third control state to the fourth control state upon determining that the force applied to the handle of the human-powered vehicle is oriented rearward of the human-powered vehicle and becomes greater than or equal to a third prescribed value.

16. The human-powered vehicle control device according to claim 11, wherein
the travel state of the human-powered vehicle includes an acceleration of the human-powered vehicle, and
the electronic controller is configured to switch from the third control state to the fourth control state upon determining the acceleration of the human-powered vehicle becomes greater than or equal to a fourth prescribed value and upon determining a value related to the acceleration becomes greater than or equal to a fifth prescribed value.

17. The human-powered vehicle control device according to claim 11, wherein
the electronic controller is configured to change the ratio such that a parameter related to at least one of the travel state of the human-powered vehicle and the travel environment of the human-powered vehicle is within a first range while in the third control state, and
the electronic controller is configured to change the ratio such that the parameter is within a second range, which is different from the first range, while in the fourth control state.

18. The human-powered vehicle control device according to claim 11, wherein
the electronic controller is configured to switch from the fourth control state to the third control state upon determining a shift operating unit has been operated to change the ratio while in the fourth control state.

19. The human-powered vehicle control device according to claim 11, wherein
the electronic controller is configured to switch from the fourth control state to the third control state in accordance with a parameter related to at least one of time, distance, position, speed, and the rotational speed of the crank while in the fourth control state.

20. A human-powered vehicle control device comprising:
an electronic controller configured to control a transmission that changes a ratio of a rotational speed of a drive wheel to a rotational speed of a crank of a human-powered vehicle,
the electronic controller being configured to switch a control state of the transmission from a fifth control state to a sixth control state upon satisfaction of a prescribed set of switching conditions,
the electronic controller being configured to control the transmission to change the ratio in accordance with an operation of a shift operating unit that can be operated by a rider to change the ratio while in the fifth control state, the electronic controller being configured to control the transmission to change the ratio irrespective of the operation of the shift operating unit while in the sixth control state, and the electronic controller being configured to switch from the fifth control state to the sixth control state irrespective of an operation of a switch operating unit that can be operated by the rider for switching from the fifth control state to the sixth control state.

21. The human-powered vehicle control device according to claim 20, wherein the electronic controller is configured to switch from the sixth control state to the fifth control state in accordance with a parameter related to at least one of time, distance, position, speed, and the rotational speed of the crank while in the sixth control state.

22. A human-powered vehicle control device comprising:

an electronic controller configured to control a transmission that changes a ratio of a rotational speed of a drive wheel to a rotational speed of a crank of a human-powered vehicle, the electronic controller being configured to switch from a seventh control state to an eighth control state upon determining that at least one of the following switching conditions has been satisfied: a shift operating unit has been operated to change the ratio, and the ratio has reached a prescribed ratio, and the electronic controller being configured to control the transmission to change in either a direction in which the ratio increases or a direction in which the ratio decreases based on at least one of a travel state of the human-powered vehicle and a travel environment of the human-powered vehicle, and irrespective of an operation of the shift operating unit while in the seventh control state.

23. The human-powered vehicle control device according to claim 22, wherein the electronic controller is configured to switch from a ninth control state to the seventh control state in accordance with at least one of a human drive force that is input to the human-powered vehicle, a rider's posture, an attitude of a vehicle body of the human-powered vehicle, a force applied to a handle of the human-powered vehicle, and the travel state of the human-powered vehicle, and the electronic controller is configured to control the transmission to change the ratio in accordance with the operation of the shift operating unit while in the ninth control state.

24. The human-powered vehicle control device according to claim 23, wherein the ninth control state is a same control state as the eighth control state.

25. The human-powered vehicle control device according to claim 22, wherein the prescribed ratio is either a largest ratio or a smallest ratio that the transmission can obtain.

* * * * *